US008136116B2

(12) United States Patent
Hosouchi et al.

(10) Patent No.: US 8,136,116 B2
(45) Date of Patent: Mar. 13, 2012

(54) DEVICE ALLOCATION UTILIZING JOB INFORMATION, STORAGE SYSTEM WITH A SPIN CONTROL FUNCTION, AND COMPUTER THEREOF

(75) Inventors: Masaaki Hosouchi, Zama (JP); Nobuhiro Maki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1100 days.

(21) Appl. No.: 11/971,466

(22) Filed: Jan. 9, 2008

(65) Prior Publication Data

US 2009/0064161 A1 Mar. 5, 2009

(30) Foreign Application Priority Data

Aug. 27, 2007 (JP) ................................. 2007-219947

(51) Int. Cl.
*G06F 9/46* (2006.01)
*G06F 1/26* (2006.01)
*G06F 1/00* (2006.01)
*G06F 3/06* (2006.01)
*G06F 12/06* (2006.01)
*G06F 21/00* (2006.01)
*G06F 13/00* (2006.01)

(52) U.S. Cl. ........ 718/104; 718/105; 713/320; 713/340; 711/4; 711/5; 711/6; 711/173

(58) Field of Classification Search ................... None
See application file for complete search history.

(56) References Cited

U.S. PATENT DOCUMENTS

| 2002/0049823 | A1* | 4/2002 | Tomita et al. ................. 709/212 |
| 2003/0051104 | A1* | 3/2003 | Riedel ............................ 711/154 |
| 2005/0160221 | A1* | 7/2005 | Yamazaki et al. ............ 711/114 |

FOREIGN PATENT DOCUMENTS

JP 7-84840 3/1995

* cited by examiner

*Primary Examiner* — Emerson Puente
*Assistant Examiner* — Adam Lee
(74) *Attorney, Agent, or Firm* — Brundidge & Stanger, P.C.

(57) ABSTRACT

This invention provides a storage system coupled to a computer that executes data processing jobs by running a program, comprising: an interface; a storage controller; and disk drives. The storage controller is configured to: control spinning of disk in the disk drives; receive job information which contains an execution order of the job and a load attribute of the job from the computer before the job is executed; select a logical volume to which none of the storage areas are allocated when requested by the computer to provide a logical volume for storing a file that is used temporarily by the job to be executed; select which storage area to allocate to the selected logical volume based on at least one of the job execution order and the job load attribute; allocate the selected storage area to the selected logical volume; and notify the computer of the selected logical volume.

17 Claims, 24 Drawing Sheets

240 SPIN STATE MANAGEMENT TABLE

| RAID GROUP IDENTIFIER | SPIN STATE FLAG | LAST ACCESS TIME | SPIN DOWN PROHIBITION FLAG |
|---|---|---|---|
| : | : | : | : |
| 000A | ON | 00:00:00 | OFF |
| 000B | ON | 00:00:00 | ON |
| 000C | ON | 00:00:00 | ON |
| 000D | ON | 00:00:00 | ON |
| 000E | OFF | 00:00:00 | ON |
| : | : | : | : |

200  LU MANAGEMENT TABLE

| LU IDENTIFIER | VIRTUALIZATION FLAG | LDEV IDENTIFIER LIST |
|---|---|---|
| : | : | : |
| 0A | OFF | 000A |
| 0B | ON | 00B |
| 0C | ON | 00C |
| : | : | : |

210  VIRTUAL LDEV MANAGEMENT TABLE

| VIRTUAL LDEV IDENTIFIER | LDEV IDENTIFIER LIST |
|---|---|
| : | : |
| 00B | 000B |
| 00C | 000C, 000D |
| : | : |

220 LDEV MANAGEMENT TABLE

| LDEV IDENTIFIER | RAID GROUP IDENTIFIER | ALLOCATION STATE | TEMPORARY USE ATTRIBUTE |
|---|---|---|---|
| : | : | : | : |
| 000A | 000A | R | — |
| 000B | 000B | V | C |
| 000C | 000C | V | I |
| 000D | 000D | V | I |
| 000E | 000E | N | — |
| : | : | : | : |
| 221 | 222 | 223 | 224 |

FIG. 6

230 ADDRESS MAPPING MANAGEMENT TABLE

| VIRTUAL LDEV ADDRESS | LDEV IDENTIFIER | LDEV ADDRESS |
|---|---|---|
| : | | : |
| 000010 | 000C | 000100 |
| 000020 | 000D | 000050 |
| : | | : |
| 231 | 232 | 233 |

FIG. 7

100 JOB NET DEFINITION INFORMATION

| JOB NET IDENTIFIER | JOB IDENTIFIER | PRECEDING JOB IDENTIFIER | START TIME |
|---|---|---|---|
| : | : | : | : |
| NET1 | JOB1 | — | 01:00:00 |
| NET1 | JOB2 | JOB1 | — |
| NET1 | JOB3 | JOB1 | — |
| : | : | : | : |

109 JOB NET DEFINITION FILE

```
UNIT=NET ID=NET1 START=01:00:00
{
    UNIT=JOB  ID=JOB1
    UNIT=JOB  ID=JOB2 F=JOB1
    UNIT=JOB  ID=JOB3 F=JOB1
}
```

FIG. 8B

110 JOB DEFINITION INFORMATION

| JOB IDENTIFIER | LOAD ATTRIBUTE |
|---|---|
| : | : |
| JOB1 | I |
| : | : |

120 JOB FILE DEFINITION INFORMATION

| JOB IDENTIFIER | FILE TYPE | FILE IDENTIFIER | LU IDENTIFIER |
|---|---|---|---|
| : | : | : | : |
| JOB1 | PERM | /dir/fileName | 0B |
| JOB1 | TEMP | A | — |
| : | : | : | : |

119 JOB DEFINITION FILE

```
JOB ID=JOB1 PEFORM=I
DD ID=/dir/fileName
DD ID=A,TYPE=TEMP
```

250 JOB INFORMATION MANAGEMENT TABLE

| JOB NET IDENTIFIER | JOB IDENTIFIER | PRECEDING JOB IDENTIFIER | LOAD ATTRIBUTE | TEMPORARY FILE | LU IDENTIFIER | VIRTUAL LU IDENTIFIER | LDEV COUNT |
|---|---|---|---|---|---|---|---|
| .. | .. | .. | .. | .. | .. | .. | .. |
| NET1 | JOB1 | — | — | USE | 0A | 0C | 2 |
| NET1 | JOB2 | JOB1 | C | USE | — | 0B | 1 |
| NET1 | JOB3 | JOB1 | C | NOT USE | — | 0B | 1 |
| .. | .. | .. | .. | .. | .. | .. | .. |
| 251 | 252 | 253 | 254 | 255 | 256 | 257 | 258 |

130 LOGICAL VOLUME LIST

| LOGICAL VOLUME IDENTIFIER | LU IDENTIFIER | VOLUME ATTRIBUTE |
|---|---|---|
| : | : | : |
| VOL01 | 0A | POWER SAVING-FIRST |
| VOL11 | 0B | PERFORMANCE-FIRST |
| VOL12 | 0C | PERFORMANCE-FIRST |
| VOL13 | 0D | PERFORMANCE-FIRST |
| : | : | : |

139 LOGICAL VOLUME LIST FILE

```
POWER SAVING-FIRST   VOL01, VOL02
PERFORMANCE-FIRST    VOL11, VOL12, VOL13
```

FIG. 22B

DEVICE ALLOCATION UTILIZING JOB INFORMATION, STORAGE SYSTEM WITH A SPIN CONTROL FUNCTION, AND COMPUTER THEREOF

CLAIM OF PRIORITY

The present application claims priority from Japanese patent application JP 2007-219947 filed on Aug. 27, 2007, the content of which is hereby incorporated by reference into this application.

BACKGROUND

The present invention relates to a storage system for storing data, and more particularly, to a technique of reducing power consumption of the storage system.

A temporary work file used by a user program, which is run in a host computer, is in some cases allocated to a storage area provided by a storage system. A logical volume to be allocated to the temporary file is chosen by a job management function, and a technique has been disclosed which picks up a logical volume whose performance matches the priority level of the user program (see JP 07-84840 A). The technique disclosed in JP 07-84840 A includes a method of selecting which one of logical volumes is to store the temporary file based on the free area or input/output load of the logical volumes and a method of choosing a logical volume that has the least input/output load.

Technology for reducing power consumption in storage systems has also been disclosed, which is called massive arrays of idle disks (MAID). MAID involves stopping the spinning of, or cutting power supply to, an inactive disk drive in order to reduce electric power consumed by control circuits of disk drives and electric power used in dissipating heat that is generated by disk drives.

In the method of allocating a logical volume as a temporary file area according to JP 07-84840 A, the temporary file area allocation takes into account the program's processing efficiency or the capacity of logical volumes but not the amount of power consumed. If the temporary file is broken up into pieces to be dispersed among many disk drives in consideration solely for the processing efficiency, MAID does not function effectively in the storage system and fails to prevent a large number of powered or spinning disk drives from increasing power consumption. On the other hand, ensuring that MAID functions effectively by localizing the temporary file to fewer disk drives lowers the processing efficiency.

SUMMARY

This invention has been made in view of this problem, and it is therefore an object of this invention to provide a technique of reducing the power consumption of a storage system while maintaining the processing efficiency of a program run in a host computer.

A representative aspect of this invention is as follows. That is, there is provided a storage system coupled to a computer that executes a data processing job by running a program, comprising: an interface coupled to the computer; a storage controller coupled to the interface; and disk drives in which data read/written by the computer is stored. The storage controller is configured to: provide logical volumes to the computer by allocating at least one storage area of the disk drives to the logical volumes; control spinning of disks in the disk drives; receive job information which contains an execution order of the job and a load attribute of the job from the computer before the job is executed; select a logical volume to which none of the storage areas are allocated when requested by the computer to provide a logical volume for storing a file that is used temporarily by the job to be executed; select which storage area to allocate to the selected logical volume based on at least one of the job execution order and the job load attribute; allocate the selected storage area to the selected logical volume; and notify the computer of the selected logical volume.

According to a mode of this invention, the power consumption of a storage system can be reduced while maintaining the processing efficiency of jobs executed in a computer.

BRIEF DESCRIPTION OF THE DRAWINGS

The present invention can be appreciated by the description which follows in conjunction with the following figures, wherein:

FIG. 2 is a diagram showing a configuration of a spin state management table according to the first embodiment of this invention;

FIG. 4 is a diagram showing a configuration of a LU management table according to the first embodiment of this invention;

FIG. 5 is a diagram showing a configuration of a virtual LDEV management table according to the first embodiment of this invention;

FIG. 6 is a diagram showing a configuration of a LDEV management table according to the first embodiment of this invention;

FIG. 7 is a diagram showing a configuration of an address mapping management table according to the first embodiment of this invention;

FIG. 8A is a diagram showing a configuration of a job net definition information according to the first embodiment of this invention;

FIG. 8B is a diagram showing an example of a job net definition file according to the first embodiment of this invention;

FIG. 9A is a diagram showing a configuration of a job definition information according to the first embodiment of this invention;

FIG. 9B is a diagram showing a configuration of a job file definition information according to the first embodiment of this invention;

FIG. 9C is a diagram showing an example of a job definition file according to the first embodiment of this invention;

FIG. 11 is a diagram showing a configuration of a job information management table according to the first embodiment of this invention;

FIG. 22A is a diagram showing a configuration of a logical volume list according to a second embodiment of this invention;

FIG. 22B is a diagram showing an example of a logical volume list file according to the second embodiment of this invention;

DETAILED DESCRIPTION OF THE PREFERRED EMBODIMENTS

Embodiments of this invention will be described below with reference to the accompanying drawings.

First Embodiment

Figure 1:
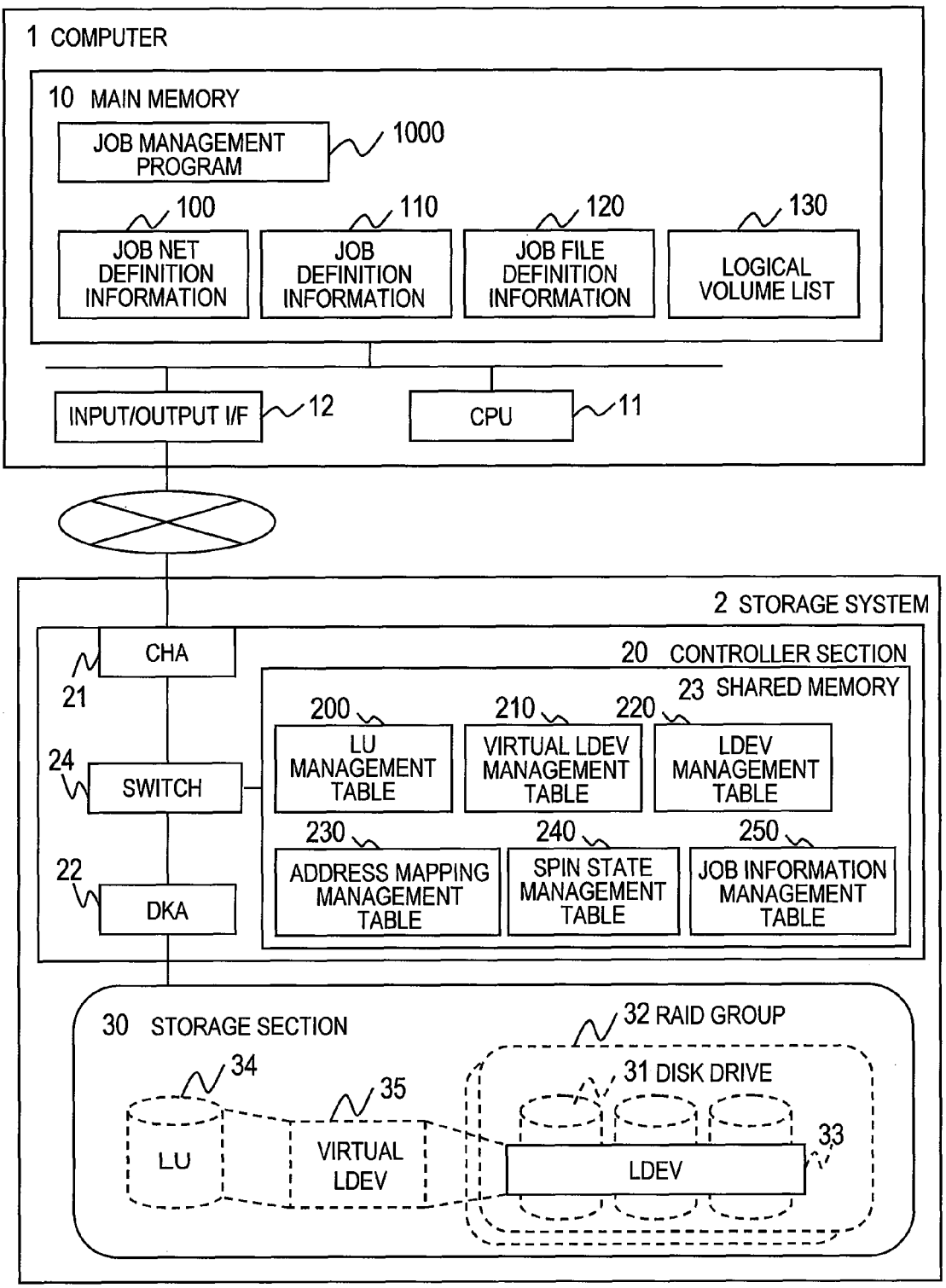
FIG. 1 is a block diagram showing a hardware configuration of a computer system in accordance with a first embodiment of this invention.

FIG. 1 is a block diagram showing the hardware configuration of a computer system 9 according to a first embodiment of this invention.

The computer system 9 contains a computer 1 and a storage system 2. The computer system 9 may contain multiple computers 1 and multiple storage systems 2. The computer 1 and the storage system 2 are connected to each other via a communication network 4, which is, for example, a storage area network (SAN), a local area network (LAN), a wide area network (WAN), the Internet, a dedicated line, or a public line.

The computer 1 has a main memory 10, a central processing unit (CPU) 11, and an input/output interface 12.

The main memory 10 stores a program run by the CPU 11 and information necessary for processing. The main memory 10 is a semiconductor memory or the like. The main memory 10 stores a job management program 1000, job net definition information 100, job definition information 110, job file definition information 120, and a logical volume list 130.

The job management program 1000 is run by the CPU 11 to send information such as a job and a job net to the storage system 2 and request the storage system 2 to execute various types of processing.

A job is a unit of work the computer 1 is requested to execute in batch style (batch processing consists of accumulating data for a fixed period of time and processing the data at once). A job net is a group of jobs to which the order of execution is set.

The job net definition information 100 contains definition information of a job net. Details of the job net definition information 100 will be described later with reference to FIG. 8A.

The job definition information 110 contains definition information of a job. Details of the job definition information 110 will be described later with reference to FIG. 9A.

The job file definition information 120 contains, for each job, definition information of a file accessed as a result of executing the job. Details of the job file definition information 120 will be described later with reference to FIG. 9B.

The logical volume list 130 holds information of logical volumes provided by the storage system 2. The logical volume list 130 is used not in the first embodiment of this invention but in a second embodiment of this invention.

The CPU 11 runs the job management program 1000 and other programs stored in the main memory 10 to execute various types of processing.

The input/output interface 12 is an interface used to access the storage system 2 via the communication network 4. A host bus adapter, for example, is employed as the input/output interface 12.

The storage system 2 contains a controller section 20 and a storage section 30. The controller section 20 controls input and output in response to data input/output requests made by the computer 1. The storage section 30 stores data input/output by the computer 1.

The controller section 20 has at least one channel adapter (CHA) 21, at least one disk adapter (DKA) 22, a shared memory 23, and a switch 24.

The CHA 21 is an interface that communicates data with the computer 1. DKA 22 is an interface that communicates data with disk drives 31. The CHA 21 and the DKA 22 can each be configured as a microcomputer system (circuit board, for example,) having a CPU, a memory, multiple communication ports, and other components.

The CHA 21 receives a read request from the computer 1 and requests the DKA 22 to read data specified by the read request. The DKA 22 reads the data out of the disk drives 31 as requested, and sends the data to the CHA 21 in response. The CHA 21 sends this data to the computer 1.

The shared memory 23 stores information referred to by the CHA 21 or the DKA 22 to control the storage system 2. The shared memory 23 is, for example, a volatile or non-volatile memory. The shared memory 23 stores an LU management table 200, a virtual LDEV management table 210, an LDEV management table 220, an address mapping management table 230, a spin state management table 240, a job information management table 250, and other information.

The LU management table 200 holds the relation between a logical unit and a logical device allocated to the logical unit. Details of the LU management table 200 will be described later with reference to FIG. 4.

The virtual LDEV management table 210 holds a list of logical devices allocated to a virtual LDEV 35, which will be described later. Details of the virtual LDEV management table 210 will be described later with reference to FIG. 5.

The LDEV management table 220 holds information including the relation between a RAID group and a logical device provided by the RAID group. Details of the LDEV management table 220 will be described later with reference to FIG. 6.

The address mapping management table 230 holds the association between the address of a storage area within one virtual LDEV 35 and the address of a storage area within one LDEV 33. Details of the address mapping management table 230 will be described later with reference to FIG. 7.

The spin state management table 240 holds, for each RAID group 32, the spin state of the disk drives 31. Details of the spin state management table 240 will be described later with reference to FIG. 2.

The job information management table 250 holds information of a job sent from the computer 1. Details of the job information management table 250 will be described later with reference to FIG. 11.

The switch 24 connects the CHA 21, the DKA 22, and the shared memory 23 to one another. The switch 24 is, for example, a crossbar switch.

The storage section 30 contains the disk drives 31. The disk drives 31 provide physical storage areas for storing data. The disk drives 31 are, for example, fibre channel (FC) disk drives, serial advanced technology attachment (SATA) disk drives, parallel advanced technology attachment (PATA) disk drives, fibre attached technology adapted (FATA) disk drives, or small computer system interface (SCSI) disk drives.

The RAID group 32 is composed of multiple disk drives 31 grouped into one. Four disk drives 31, for example, are grouped into one set (3D+1P) to define the RAID group 32, which is a logical storage area.

The disk spin state of the disk drives 31 can be changed with a SCSI command or other types of command issued by a control program that the memory within the DKA 22 stores. A change from a spin-off state to a spin-on state is called spin up whereas a shift from a spin-on state to a spin-off state is called spin down. The DKA 22 issues a spin down command to, for instance, a disk drive 31 that has not been accessed for a fixed period of time, or issues a spin up command to a spin-off disk drive 31 before issuing an input/output command to this disk drive 31. Spin up/spin down control is executed on a RAID group 32 basis in the first embodiment of this invention, but may be performed on two or more RAID groups at a time.

Instead of controlling spin up/spin down of the disk drives 31, the DKA 22 may control power on/off of the disk drives 31 through a power supply control circuit for the disk drives 31 which is installed within the storage system 2. The following description can be read as a description of processing that is executed in a case where the DKA 22 controls power on/off of the disk drives 31 if "spin", "spin down" and "spin up" in the following description are substituted with "power" "power off" and "power on", respectively.

The logical device (LDEV) 33 is a logical storage area defined in the RAID group 32. The LDEV 33 is a storage area containing at least one storage area that is obtained by logically partitioning physical storage areas that the disk drives 32 constituting the RAID group 32 provide. Data stored in the LDEV 33 and parity created from the data are stored in multiple disk drives 31 in a dispersed manner.

A logical unit (LU) 34 is a logical storage area to which the LDEV 33 or the virtual LDEV 35 is allocated. The computer 1 recognizes each LU 34 as one logical volume.

The virtual LDEV 35 is a logical device of which only some areas, or none of areas, are allocated storage areas that the disk drives 31 provide. Storage areas of the disk drives 31 are allocated to the virtual LDEV 35 as the need arises. The LDEV 33, on the other hand, is allocated storage areas of the disk drives 31 in every area within the LDEV 33 at the time the LDEV 33 is defined. The LU 34 that is allocated the virtual LDEV 35 is defined as a virtual LU whereas the LU 34 that is allocated the LDEV 33 directly without the intermediary virtual LDEV 35 is defined as a real LU.

FIG. 2 is a diagram showing the configuration of the spin state management table 240 according to the first embodiment of this invention.

The spin state management table 240 has an entry for each RAID group 32. Each entry of the spin state management table 240 contains a RAID group identifier 241, a spin state flag 242, a last access time 243, and a spin down prohibition flag 244.

The RAID group identifier 241 indicates an identifier used to identify the RAID group 32 in question uniquely throughout the storage system 2.

The spin state flag 242 is a flag used to determine whether the disk drives 31 constituting the RAID group 32 are in a spin-on state or a spin-off state. The disk drives 31 are in a spin-on state when the value of the spin state flag 242 is "ON" and in a spin-off state when the value of the spin state flag 242 is "OFF".

The last access time 243 indicates when the disk drives 31 constituting the RAID group 32 have been accessed last.

The spin down prohibition flag 244 is a flag used to keep the disk drives 31 in a spin-on state even when the disk drives 31 have not been accessed for a fixed period of time. Spin down of the disk drives 31 is not permitted when the spin down prohibition flag 244 is on.

In a case where the DKA 22 controls power on/off of the disk drives 31, the "spin state flag" and the "spin down prohibition flag" are replaced with a "power on/off flag" and a "power off prohibition flag", respectively.

Figure 3:
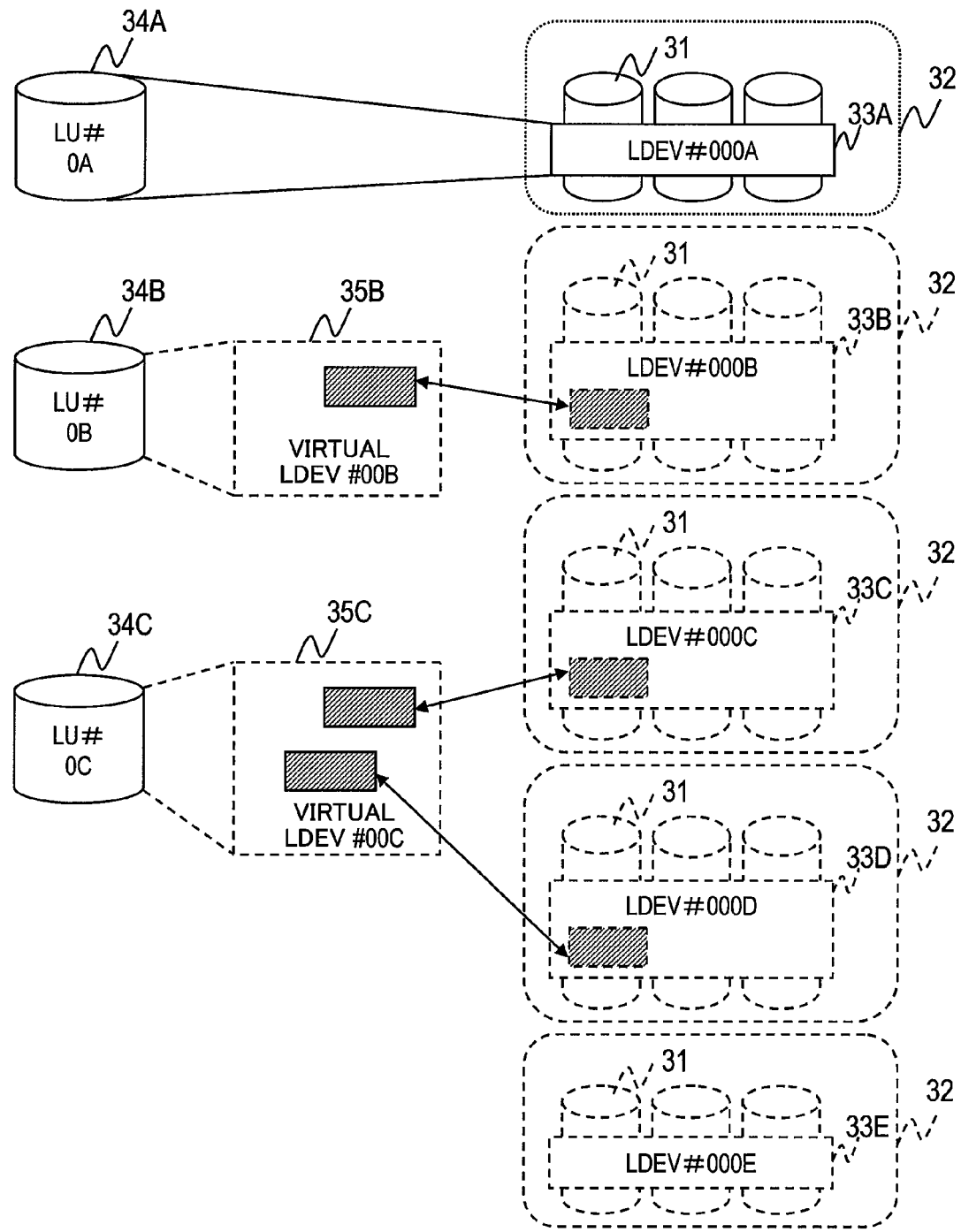
FIG. 3 is a diagram showing an example of a relation between a logical unit and a logical device according to the first embodiment of this invention.

FIG. 3 is a diagram showing an example of the relation between a logical unit and a logical device according to the first embodiment of this invention.

An LU 34A represents a real LU to which an LDEV 33A that the RAID group 32 composed of the disk drives 31 provides is mapped directly.

An LU 34B and an LU 34C represent virtual LUs mapped to a virtual LDEV 35B and a virtual LDEV 35C, respectively, instead of being mapped directly to the LDEVs 33 like the LU 34A.

When the computer 1 issues a data output request to a virtual LU, some or all of storage areas provided by a group of LDEVs 33 are dynamically allocated to the relevant virtual LDEV 35. In the case of the virtual LDEV 35C, for example, its group of LDEVs 33 includes an LDEV 33C and an LDEV 33D. To output data to the LU 34C, storage areas provided by the LDEV 33C and the LDEV 33D are dynamically allocated to the virtual LDEV 35C.

FIG. 4 is a diagram showing the configuration of the LU management table 200 according to the first embodiment of this invention.

The LU management table 200 holds entries for all of real LUs and virtual LUs contained in the storage system 2. Each entry of the LU management table 200 contains an LU identifier 201, a virtualization flag 202, and an LDEV identifier list 203.

The LU identifier 201 indicates an identifier used to identify the LU 34 in question uniquely throughout the storage system 2. The LU identifier 201 is expressed as, for example, a channel connection address (CCA) or a combination of a logical unit number (LUN) and a channel number (an identifier of the CHA 21).

The virtualization flag 202 is a flag used to determine whether or not there is any virtual LDEV 35 allocated to the LU 34. A value "OFF" of the virtualization flag 202 indicates that the LU 34 is mapped directly to at least one LDEV 33 whereas a value "ON" indicates that the LU 34 is mapped to at least one virtual LDEV 35.

The LDEV identifier list 203 is a list of the LDEV identifiers of the LDEVs 33 mapped to the LU 34 when the value of the virtualization flag 202 is "OFF". An LDEV identifier is an identifier used to identify each LDEV 33 uniquely throughout the storage system 2, and is expressed as, for example, a logical device number (LDEV#).

The LDEV identifier list 203 is a list of the virtual LDEV identifiers of the virtual LDEVs 35 mapped to the LU 34 when the value of the virtualization flag 202 is "ON". A virtual LDEV identifier is an identifier used to identify each virtual LDEV 35 uniquely throughout the storage system 2. Virtual LDEV identifiers have a management system separate from that of LDEV identifiers.

FIG. 5 is a diagram showing the configuration of the virtual LDEV management table 210 according to the first embodiment of this invention.

The virtual LDEV management table 210 holds an entry for each virtual LDEV 35 within the storage system 2. Each entry of the virtual LDEV management table 210 contains a virtual LDEV identifier 211 and an LDEV identifier list 212.

The virtual LDEV identifier 211 indicates an identifier used to identify the virtual LDEV 35 in question. The LDEV identifier list 212 is a list of the LDEV identifiers of the LDEVs 33 that provide storage areas mapped to the storage area of the virtual LDEV 35.

FIG. 6 is a diagram showing the configuration of the LDEV management table 220 according to the first embodiment of this invention.

The LDEV management table 220 holds an entry for each LDEV 33 defined in the storage system 2. Each entry of the LDEV management table 220 contains an LDEV identifier 221, a RAID group identifier 222, an allocation state 223, and a temporary use attribute 224.

The LDEV identifier 221 indicates an identifier used to identify the LDEV 33 in question. The RAID group identifier 222 indicates the identifier of the RAID group 32 composed of the disk drives 31 that provide storage areas to the LDEV 33.

The allocation state 223 indicates the way the LDEV 33 is allocated to a specific LU 34. Specifically, the allocation state 223 holds a value "R" when the LDEV 33 is allocated directly to the LU 34, a value "V" when it is the associated virtual LDEV 35 that is allocated to the LU 34, and a value "N" when no LDEV is allocated to the LU 34.

The temporary use attribute 224 indicates an attribute of a temporary file allocated to the LDEV 33 when the value of the allocation state 223 is "V". Specifically, the temporary use attribute 224 holds a value "C" when the LDEV 33 is allocated a temporary file of a CPU bound job which causes heavy CPU load, and a value "I" when the LDEV 33 is allocated a temporary file of an I/O bound job which causes heavy input/output (I/O) load.

FIG. 7 is a diagram showing the configuration of the address mapping management table 230 according to the first embodiment of this invention.

The address mapping management table 230 holds information on mapping between the address of a storage area provided by one virtual LDEV 35 and the address of a storage area provided by one LDEV 33. The address mapping management table 230 is created for each virtual LDEV 35, and holds an entry for each address within the virtual LDEV 35 that is mapped to an address in one LDEV 33 (meaning that real data is in the disk drives 31). An address is a number assigned to each of equal-sized sections of each virtual LDEV 35 or LDEV 33. An address in one virtual LDEV 35 is associated with an address in a group of LDEVs 33 that are used by this virtual LDEV 35.

Each entry of the address mapping management table 230 contains a virtual LDEV address 231, an LDEV identifier 232, which indicates the identifier of the LDEV 33 that is allocated to the virtual LDEV 35 in question, and an LDEV address 233, which indicates the address of this LDEV 33.

A program and information necessary for the computer 1 to execute batch processing will now be described. The necessary program and information are specifically the job management program 1000, the job net definition information 100, the job definition information 110, and the job file definition information 120.

The CPU 11 of the computer 1 runs the job management program 1000, to thereby read definition files out of a logical volume accessible to the computer 1 (i.e., the LDEV 33 to which the logical volume is mapped). The thus read definition files are a job net definition file 109 and a job definition file 119.

The CPU 11 of the computer 1 analyzes the read definition files and sends the analyzed information to the job net definition information 100, the job definition information 110, and the job file definition information 120.

The configuration of the job net definition information 100 is shown in FIG. 8A and an example of the job net definition file 109 is shown in FIG. 8B. The configuration of the job definition information 110 is shown in FIG. 9A. FIG. 9B shows the configuration of the job file definition information 120, which contains, for each job, definition information of a file accessed as a result of executing the job. An example of the job definition file 119 is shown in FIG. 9C. A file is a logical group of data stored in a logical volume, and a program run in the computer 1 accesses data on a file basis.

FIG. 8A is a diagram showing the configuration of the job net definition information 100 according to the first embodiment of this invention.

The job net definition information 100 holds an entry for each job. Each entry of the job net definition information 100 contains a job net identifier 101, a job identifier 102, a preceding job identifier 103, and a start time 104.

The job net identifier 101 indicates an identifier used to identify a job net. The job identifier 102 indicates an identifier used to identify each job contained in the job net uniquely throughout the computer system 9. The preceding job identifier 103 indicates the identifier of a job that is executed before the job in question. The start time 104 indicates when the job net is started.

In FIG. 8A, the preceding job identifier is JOB1 for JOB2 and JOB3, and NET1 is a job net that executes JOB2 and JOB3 simultaneously after JOB 1 is completed. JOB 1 is executed at 1 o'clock everyday.

FIG. 8B is a diagram showing an example of the job net definition file 109 according to the first embodiment of this invention.

"NET1" following "UNIT=NET ID=" is a value of the job net identifier 101. "01:00:00" following "START=" is a value of the job net start time 104. "JOB1" following "UNIT=JOB ID=" is a value of the job identifier 102. "JOB1" following "F=" is a value of the preceding job identifier 103.

FIG. 9A is a diagram showing the configuration of the job definition information 110 according to the first embodiment of this invention.

The job definition information 110 holds an entry for each job. Each entry of the job definition information 110 contains a job identifier 111 and a load attribute 112, as well as information necessary to execute the job such as the name of a program that executes the job.

The job identifier 111 indicates an identifier used to identify the job in question. The load attribute 112 is information used to determine whether the job is a CPU bound job which causes heavy CPU load or an I/O bound job which causes heavy I/O load. The load attribute 112 holds a value "C" when the job is a CPU bound job and a value "I" when the job is an I/O bound job.

FIG. 9B is a diagram showing the configuration of the job file definition information 120 according to the first embodiment of this invention.

The job file definition information 120 holds an entry for each file. The job file definition information 120 keeps information on a file accessed during a job. Each entry of the job file definition information 120 contains a job identifier 121, a file type 122, a file identifier 123, and an LU identifier 124.

The job identifier 121 indicates an identifier used to identify a job. The file type 122 is information used to identify whether a file accessed during the job is a permanent file or a temporary file. A permanent file is a file that has been present prior to the start of a job and that is not deleted after the completion of the job. A temporary file is a work file that is used during a job and becomes unnecessary once the job is completed. The file type 122 holds a value "PERM" when the file is a permanent file and a value "TEMP" when the file is a temporary file.

The file identifier 123 indicates the path name ("/dir/file-Name" in FIG. 9B) of the file when the file is a permanent file and, when the file is a temporary file, a temporary file identifier ("A" in FIG. 9B) used by a program of the job to identify the temporary file.

As the LU identifier 124, the LU identifier 201 of a logical volume is stored in a case where the file is a permanent file. To obtain the LU identifier 201 of a logical volume, the identifier (e.g., a device identifier or a device number) of a logical volume that stores the permanent file is obtained from a path name with the use of an interface provided by an OS, and an inquiry is made to the storage system 2.

FIG. 9C is a diagram showing an example of the job definition file 119 according to the first embodiment of this invention.

"JOB1" following "JOB ID=" in the first line is a value of the job identifier 111 (121). "I" following "PERFORM=" is a value of the load attribute 112 indicating that the job is an I/O bound job.

The second line shows that a permanent file at a path "/dir/fileName" is accessed in processing of JOB1. "TYPE=PERM" may be written in the second row to indicate clearly that the file is a permanent file. The third line shows that a temporary file having an identifier "A" is used in processing of JOB 1.

Figure 10:
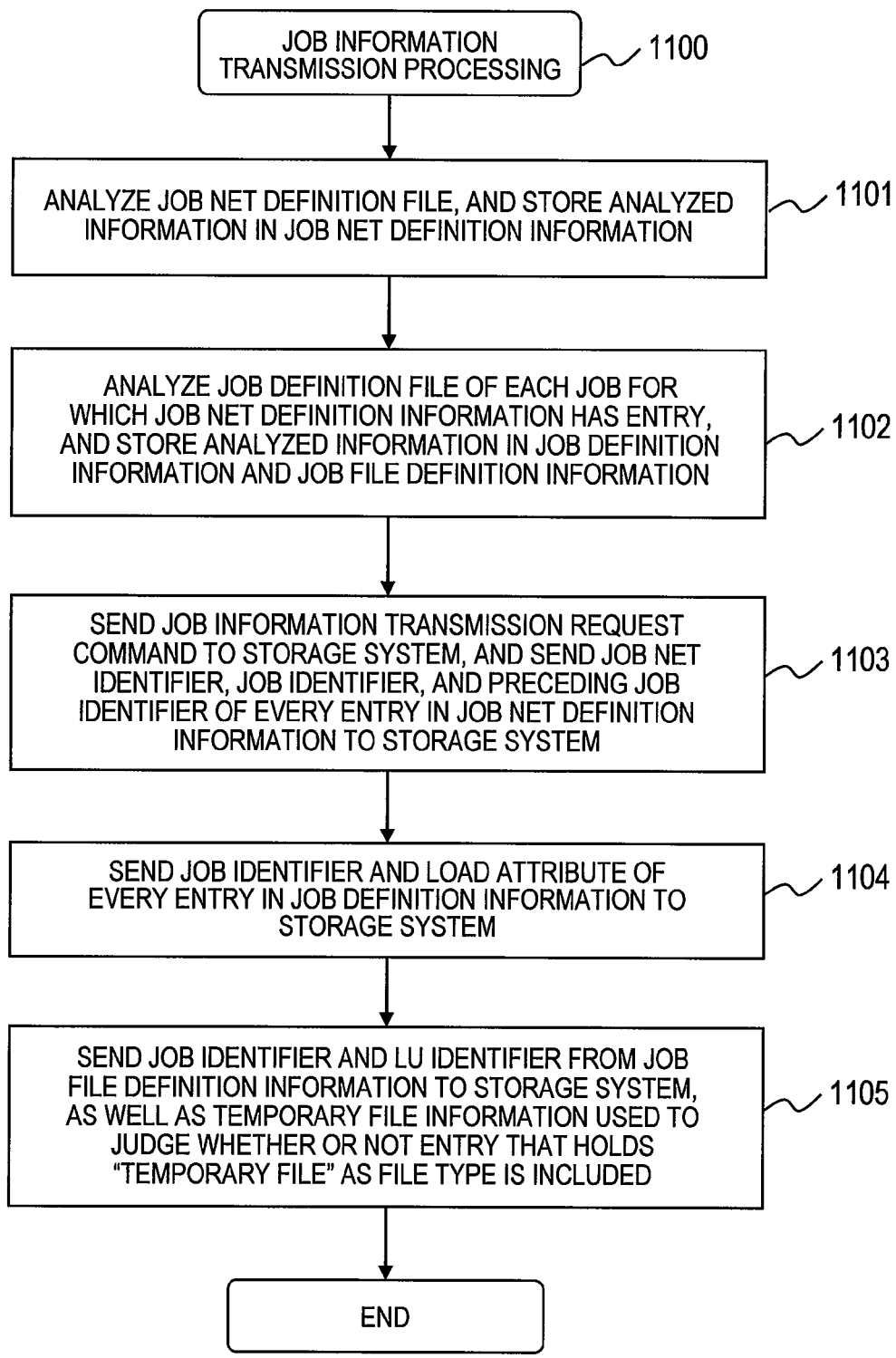
FIG. 10 is a flow chart showing a procedure of job information transmission processing according to the first embodiment of this invention.

FIG. 10 is a flow chart showing a procedure of job information transmission processing 1100 according to the first embodiment of this invention. This processing is executed by the CPU 11 of the computer 1 by running the job management program 1000.

The CPU 11 of the computer 1 reads out of the storage system 2 or other places the job net definition file 109 of a job net that is instructed by a user to be executed. The CPU 11 of the computer 1 allocates a memory area large enough to store the read job net definition information 100 in the main memory 10, and analyzes information in the read job net definition file 109. From the job net definition file 109, the job net identifier 101, the job identifier 102, and the preceding job identifier 103 are extracted and stored in the job net definition information 100 (Step 1101).

The CPU 11 of the computer 1 reads out of the storage system 2 or other places the job definition file 119 of a job that is identified by the job identifier 102 in one entry of the job net definition information 100, and repeats this for the rest of the entries in the job net definition information 100. The CPU 11 of the computer 1 allocates a memory area large enough to store the job definition information 110 and the job file definition information 120 in the main memory 10, and analyzes each job definition file 119 read. From the job definition file 119, the job identifier 111, the load attribute 112, the file type 122, the file identifier 123, and the LU identifier 124 are extracted and stored in the job definition information 110 and the job file definition information 120 (Step 1102).

The CPU 11 of the computer 1 sends a job information transmission request command to the storage system 2. The CPU 11 of the computer 1 also sends to the storage system 2 the job net identifier 101, job identifier 102, and preceding job identifier 103 of every entry in the job net definition information 100 (Step 1103).

The CPU 11 of the computer 1 further sends the job identifier 111 and load attribute 112 of every entry in the job definition information 110 to the storage system 2 (Step 1104).

The CPU 11 of the computer 1 extracts from the job file definition information 120 an entry whose job identifier 121 matches the job identifier 111 of one entry in the job definition information 110, and repeats this for the rest of the entries in the job definition information 110. The CPU 11 of the computer 1 then sends temporary file information and the LU identifier 124 of every extracted entry to the storage system 2 (Step 1105). The temporary file information is used to judge whether or not the extracted entries include at least one entry that has "TEMP" as the file type 122.

The controller section 20 of the storage system 2 receives through the CHA 21 the information sent from the computer 1 in Steps 1103 to 1105 of the job information transmission processing 1100. The controller section 20 stores the received information in the job information management table 250 kept in the shared memory 23.

FIG. 11 is a diagram showing the configuration of the job information management table 250 according to the first embodiment of this invention.

The job information management table 250 holds an entry for each job. Each entry of the job information management table 250 contains a job net identifier 251, a job identifier 252, a preceding job identifier 253, a load attribute 254, a temporary file 255, an LU identifier 256, a virtual LU identifier 257, and an LDEV count 258.

The job net identifier 251 indicates the identifier of a job net that contains a job for which the entry in question is created. The job identifier 252 indicates the identifier of the job for which the entry is created. The preceding job identifier 253 indicates the identifier of a job that is processed prior to the job for which the entry is created.

The load attribute 254 corresponds to the load attribute 112 in the job definition information 110. The load attribute 254 indicates information used to determine whether the job identified by the job identifier 252 is a CPU bound job which causes heavy CPU load or an I/O bound job which causes heavy I/O load.

The temporary file 255 indicates information used to judge whether or not the job identified by the job identifier 252 uses a temporary file.

The LU identifier 256 is a list of the identifiers of the LUs 34 to which all permanent files accessed by the job identified by the job identifier 252 are allocated.

The virtual LU identifier 257 is a list of the identifiers of virtual LUs that are allocated in advance as a place to store the temporary file. The LDEV count 258 indicates the count of LDEVs 33 allocated to the virtual LDEV 35 that is associated with the virtual LU identified by the virtual LU identifier 257.

Figure 12:
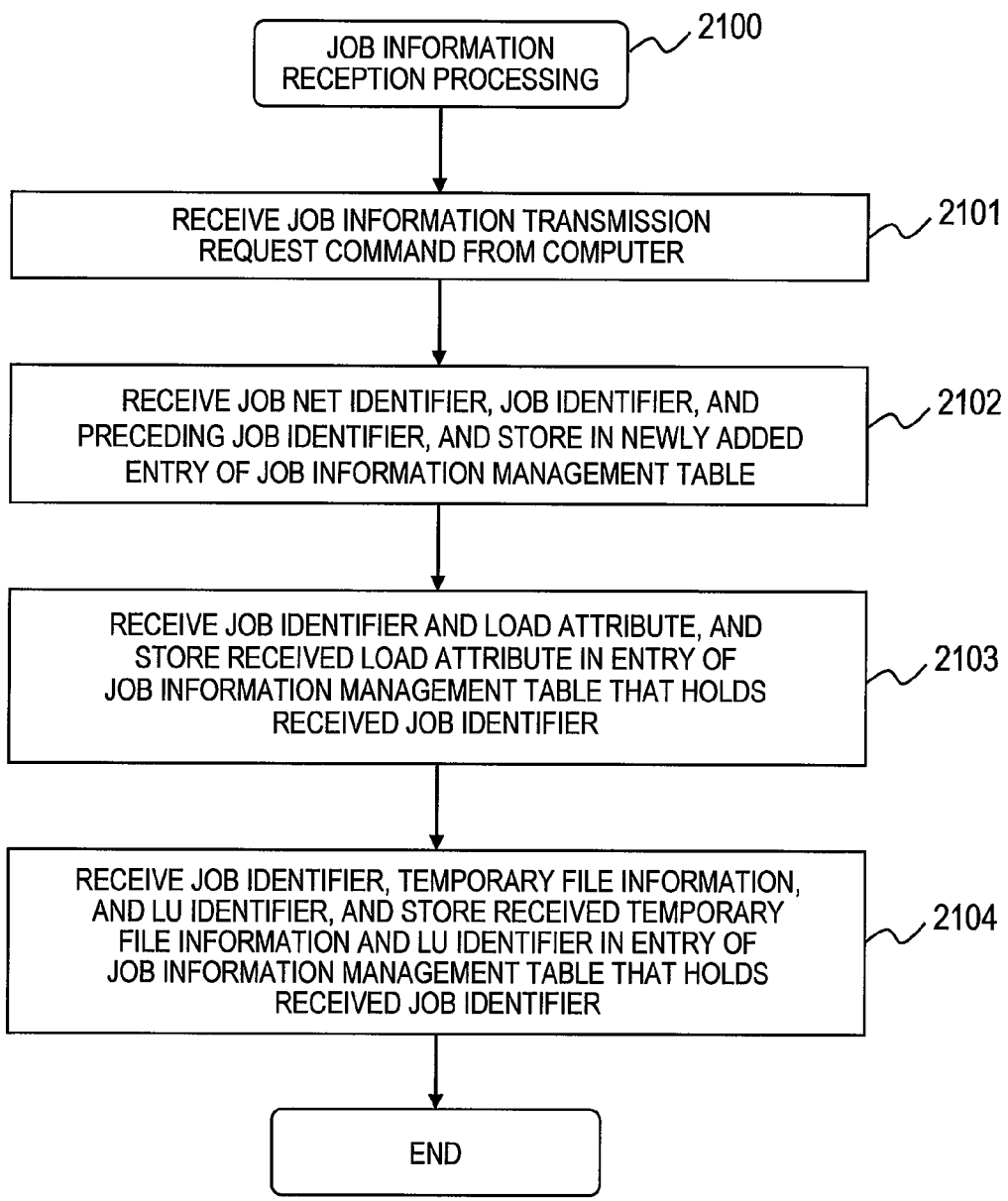
FIG. 12 is a flow chart showing a procedure of job information reception processing according to the first embodiment of this invention.

FIG. 12 is a flow chart showing a procedure of job information reception processing 2100 according to the first embodiment of this invention.

This processing is executed by running the control program stored in the controller section 20. Through this processing, job information sent from the computer 1 is stored in the job information management table 250.

The controller section 20 of the storage system 2 starts the job information reception processing when the CHA 21 receives a job information transmission request command from the computer 1 (Step 2101).

The CHA 21 of the storage system 2 receives a set of data consisting of the job net identifier 101, the job identifier 102, and the preceding job identifier 103. The controller section 20 of the storage system 2 adds a new entry to the job information management table 250 for each data set received, and stores the received data in the new entry as the job net identifier 251, the job identifier 252, and the preceding job identifier 253 (Step 2102).

The CHA 21 of the storage system 2 receives a set of data consisting of the job identifier 111 and the load attribute 112. The controller section 20 of the storage system 2 stores the received load attribute 112 as the load attribute 254 in an entry of the job information management table 250 whose job identifier 252 matches the received job identifier 111 (Step 2103).

The CHA 21 of the storage system 2 receives a set of data consisting of the job identifier 111, temporary file information, and at least one LU identifier. The controller section 20 of the storage system 2 stores the received temporary file information and LU identifier as the temporary file 255 and the LU identifier 256 in an entry of the job information management table 250 whose job identifier 252 matches the received job identifier 111 (Step 2104).

Processing performed in executing any job will now be described.

The CPU 11 of the computer 1 starts executing a job when an entry of the job net definition information 100 for this job holds the current time as the start time 104.

When a job that has an entry in the job net definition information 100 becomes ready to be executed, the CPU 11 of the computer 1 performs pre-job execution processing 1200 on an LU (logical volume) that stores a permanent file and temporary file accessed during the job, and then executes the job. A job ready to be executed is an unexecuted job whose start time 104 has passed or an unexecuted job whose preceding job has been completed.

The pre-job execution processing 1200 may be performed on every job in a job net before a job becomes ready to be executed, for example, when the job net is started.

In a case where only a limited count of jobs can be executed simultaneously in the computer 1 and a job becomes ready to be executed after the count of jobs that are being executed has already reached the limit of simultaneously executable jobs, the pre-job execution processing 1200 is executed at some point prior to the actual execution of the job. For instance, the pre-job execution processing 1200 is executed while the job is included in a job queue, to thereby spin up a logical volume to be accessed. This way, the job can be executed without waiting for the logical volume to spin up at the start of the execution of the job.

Figure 13:
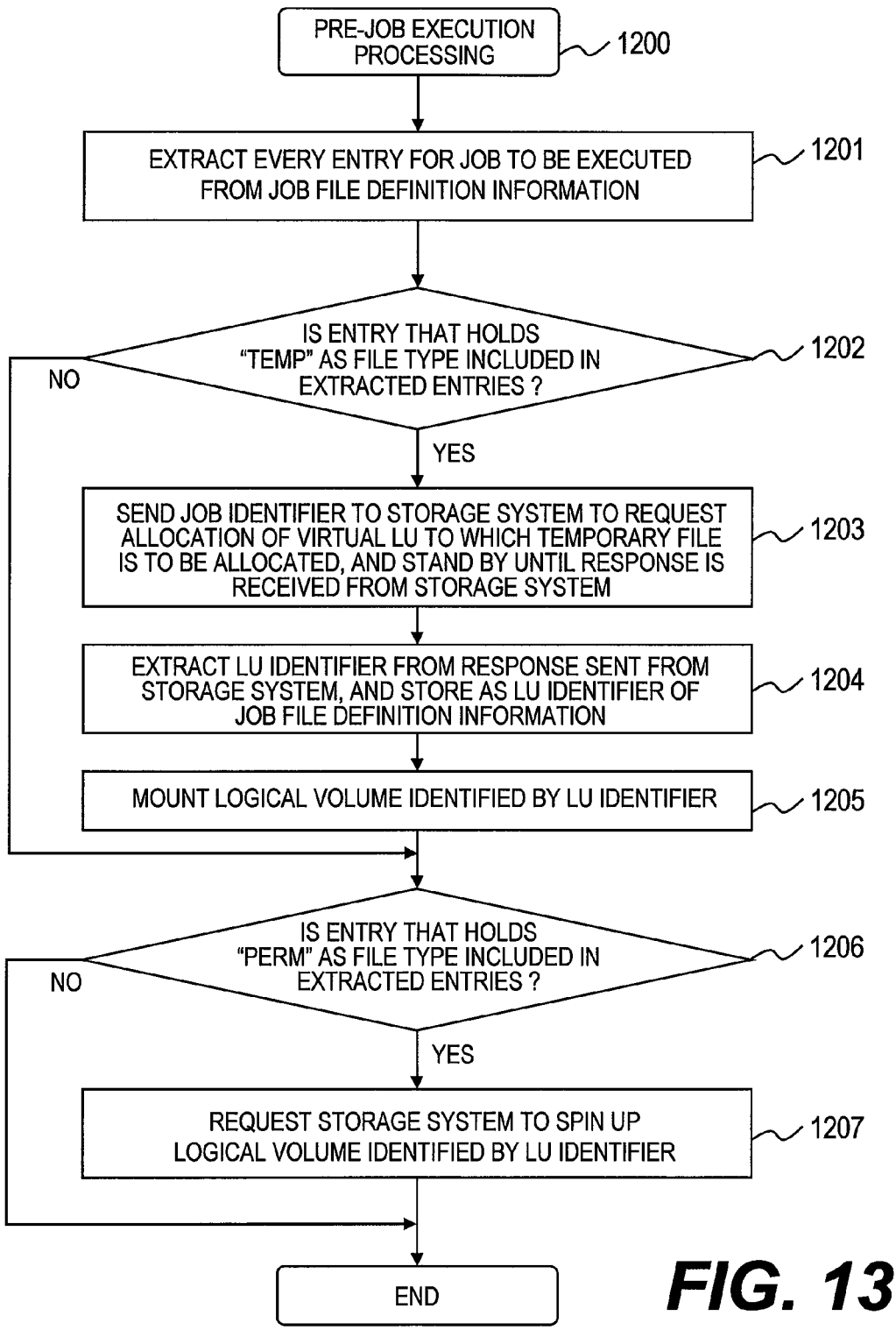
FIG. 13 is a flow chart showing a procedure of a pre-job execution processing according to the first embodiment of this invention.

FIG. 13 is a flow chart showing a procedure of the pre-job execution processing 1200 according to the first embodiment of this invention. This processing is executed by the CPU 11 of the computer 1 by running the job management program 1000.

The CPU 11 of the computer 1 extracts from the job file definition information 120 an entry whose job identifier 121 matches the job identifier of a job to be executed (Step 1201).

The CPU 11 of the computer 1 judges whether or not the value of the file type 122 is "TEMP" in any of the extracted entries (Step 1202). When none of the extracted entries holds "TEMP" as the value of the file type 122 (the answer to Step 1202 is "No"), Step 1206 is executed.

When at least one of the extracted entries holds "TEMP" as the value of the file type 122 (the answer to Step 1202 is "Yes"), the CPU 11 of the computer 1 sends the job identifier of the entry to the storage system 2 and requests to allocate at least one LDEV 33 to a virtual LU of a logical volume to which the temporary file is to be allocated (Step 1203). The CPU 11 of the computer 1 then waits for the storage system 2 to send a response notifying the completion of the LDEV 33.

Receiving the response from the storage system 2, the CPU 11 of the computer 1 records as the LU identifier 124 an LU identifier contained in the response from the storage system 2 (Step 1204). The CPU 11 of the computer 1 then mounts a logical volume identified by the LU identifier 124 (Step 1205).

The CPU 11 of the computer 1 notifies the job to be executed of the path name of a directory to which the logical volume is mounted, or the path name of a temporary file created in the directory to which the logical volume is mounted, in the form of an environment variable or an argument.

The CPU 11 of the computer 1 judges whether or not the value of the file type 122 is "PERM" in any of the extracted entries (Step 1206). When at least one of the extracted entries holds "PERM" as the value of the file type 122 (the answer to Step 1206 is "Yes"), the CPU 11 of the computer 1 requests the storage system 2 to spin up a logical volume identified by the LU identifier 124 of this extracted entry (Step 1207). In Step 1207, spin up of the logical volume identified by the LU identifier 124 of the extracted entry may be accomplished by accessing this logical volume.

Figure 14:
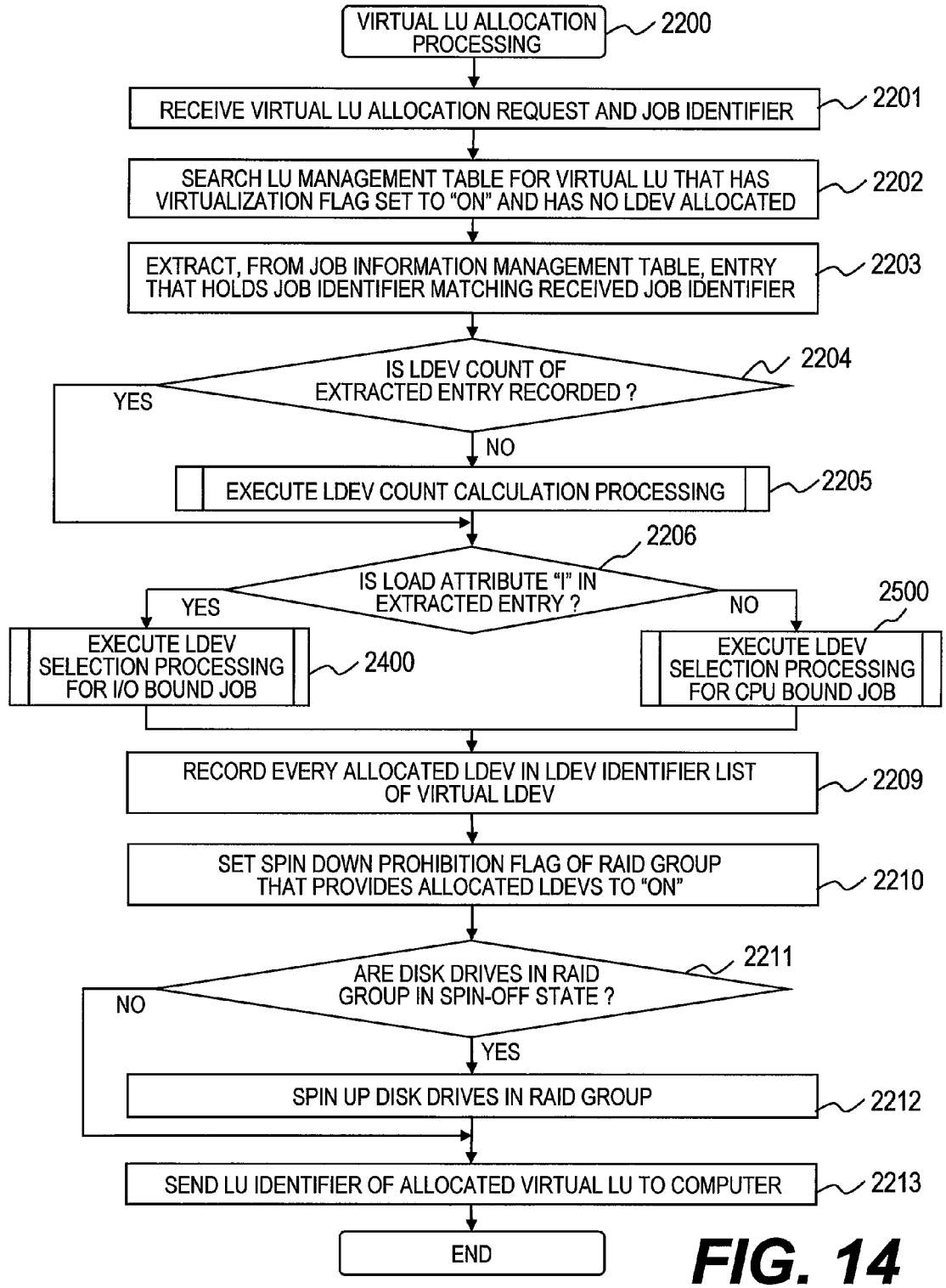
FIG. 14 is a flow chart showing a procedure of virtual LU allocation processing according to the first embodiment of this invention.

FIG. 14 is a flow chart showing a procedure of virtual LU allocation processing 2200 according to the first embodiment of this invention. This processing is executed by running the control program stored in the controller section 20.

The controller section 20 of the storage system 2 starts the virtual LU allocation processing 2200 when the CHA 21 receives the virtual LU allocation request and the job identifier which have been sent from the computer 1 in Step 1203 of FIG. 13 (Step 2201).

The controller section 20 of the storage system 2 first searches the LU management table 200 for an entry whose virtualization flag 202 is "ON", extracts from the LDEV identifier list 203 of this entry the virtual LDEV 35 to which no LDEV 33 is allocated, and finds a virtual LU that is associated with this virtual LDEV 35 (Step 2202).

The controller section 20 of the storage system 2 next searches the job information management table 250 for an entry whose job identifier 252 matches the received job identifier (Step 2203).

The controller section 20 of the storage system 2 judges whether or not the found entry of the job information management table 250 has a value recorded as the LDEV count 258 (Step 2204). When no value is recorded as the LDEV count 258 in the found entry (the answer to Step 2204 is "No"), LDEV count calculation processing 2300 is executed to calculate how many LDEVs are to be allocated to the job (Step 2205).

The controller section 20 of the storage system 2 also judges whether or not the value of the load attribute 254 in the found entry is "I" in order to make an appropriate selection of LDEVs 33 that suits the load attribute 254 (Step 2206).

When the load attribute 254 has the value "I" (the answer to Step 2206 is "Yes"), the controller section 20 of the storage system 2 executes processing of selecting LDEVs for an I/O bound job to allocate at least one LDEV 33 to the virtual LDEV 35 (Step 2400).

When the load attribute 254 has the value "C" (the answer to Step 2206 is "No"), the controller section 20 of the storage system 2 executes processing of selecting LDEVs for a CPU bound job to allocate at least one LDEV 33 to the virtual LDEV 35 (Step 2500).

The controller section 20 of the storage system 2 records the identifier of the LDEV 33 allocated in Step 2400 or Step 2500 in the LDEV identifier list 212 that includes the virtual LDEV 35 that is associated with the virtual LU found in Step 2202 (Step 2209).

The controller section 20 of the storage system 2 searches the spin state management table 240 for an entry for the RAID group 32 that provides any of the newly allocated LDEVs 33 or any of the LDEVs 33 allocated to an LU that is identified by the LU identifier 256, and sets the spin down prohibition flag 244 of the found entry to "ON" (Step 2210). This prevents spin down of a disk drive that is in use during the execution of a job, thus preventing the processing performance from lowering.

The controller section 20 of the storage system 2 judges whether or not the spin state flag 242 is "OFF" in the entry for the RAID group 32 whose spin down prohibition flag 244 has been set to "ON" in Step 2210 (Step 2211). When the spin state flag 242 of the RAID group 32 is "OFF" (the answer to Step 2211 is "Yes"), spin up is performed on every disk drive 31 belonging to the RAID group 32 for which this entry has been created (Step 2212).

Lastly, the controller section 20 of the storage system 2 sends the LU identifier of the virtual LU found in Step 2202 to the computer 1 through the CHA 21 (Step 2213).

Figure 15:
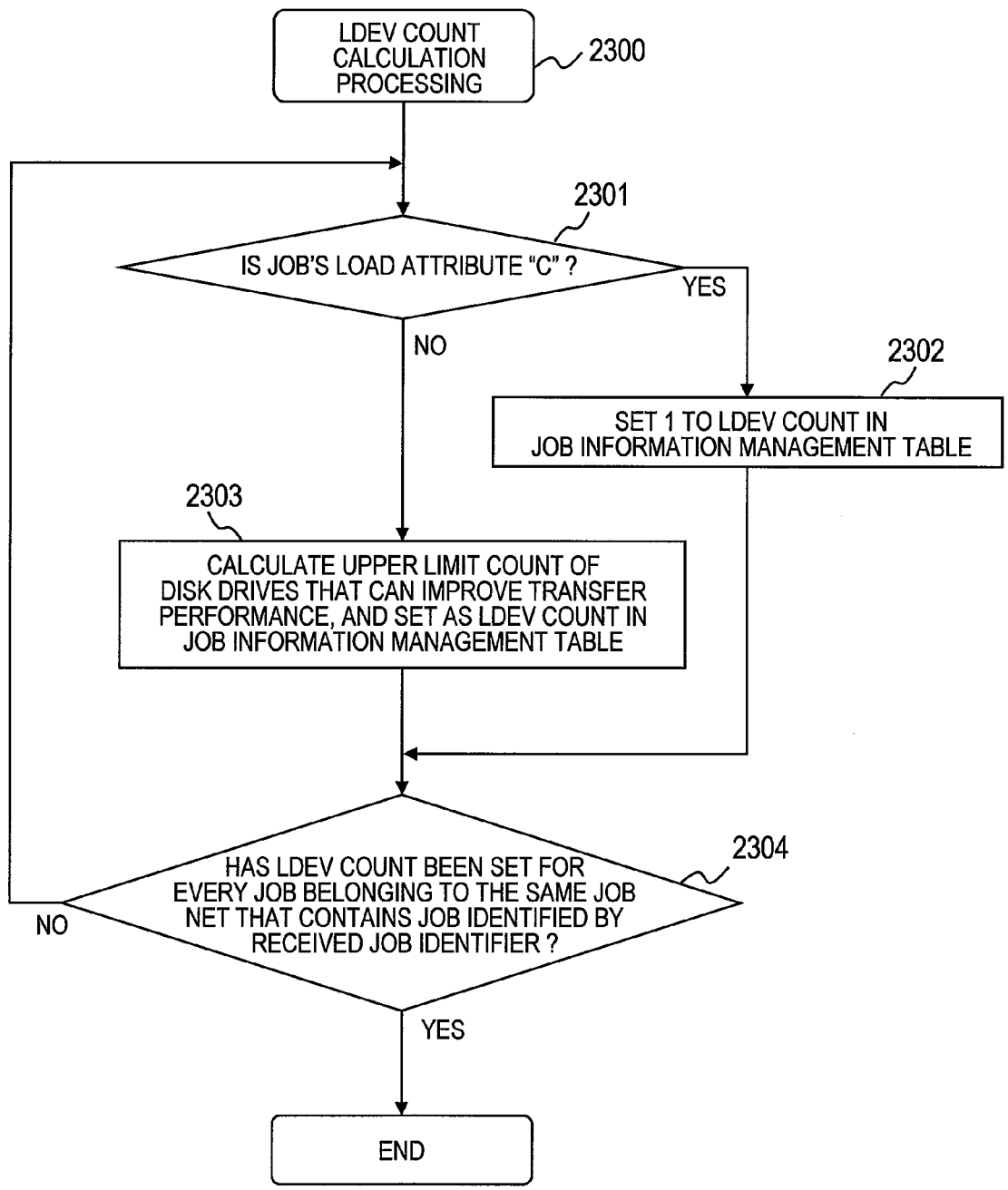
FIG. 15 is a flow chart showing a procedure of a LDEV count calculation processing according to the first embodiment of this invention.

FIG. 15 is a flow chart showing a procedure of the LDEV count calculation processing 2300 according to the first embodiment of this invention.

The controller section 20 of the storage system 2 judges whether or not the load attribute 254 holds the value "C", in other words, whether or not the load attribute of the job is that of a CPU bound job, in an entry of the job information management table 250 whose job identifier 252 matches the received job identifier (Step 2301).

When the load attribute 254 of this entry has the value "C" (the answer to Step 2301 is "Yes"), the controller section 20 of the storage system 2 records 1 as the LDEV count 258 of this entry (Step 2302). Since CPU bound jobs are small in processing load caused by disk access, power can be saved by setting the count of the LDEVs 33 used to 1.

When the load attribute 254 of this entry has the value "I" instead of "C" (the answer to Step 2301 is "No"), the controller section 20 of the storage system 2 calculates how many LDEVs 33 are necessary and records the calculated count as the LDEV count 258 of this entry (Step 2303). Specifically, the controller section 20 of the storage system 2 calculates the upper limit count of the disk drives 31 that can be allocated to improve the transfer performance, based on the maximum amount of data transferred per unit time between the computer 1 and the virtual LU found in Step 2202 and the maximum data transfer amount per unit time of the disk drives 31. Since I/O bound jobs are large in processing load caused by disk access, an LDEV count that can improve the processing performance to the maximum is set as the LDEV count 258.

The controller section 20 of the storage system 2 performs Steps 2301 to 2303 on another job in the job net that contains the job identified by the received job identifier to set the LDEV count 258 (Step 2304).

Figure 16:
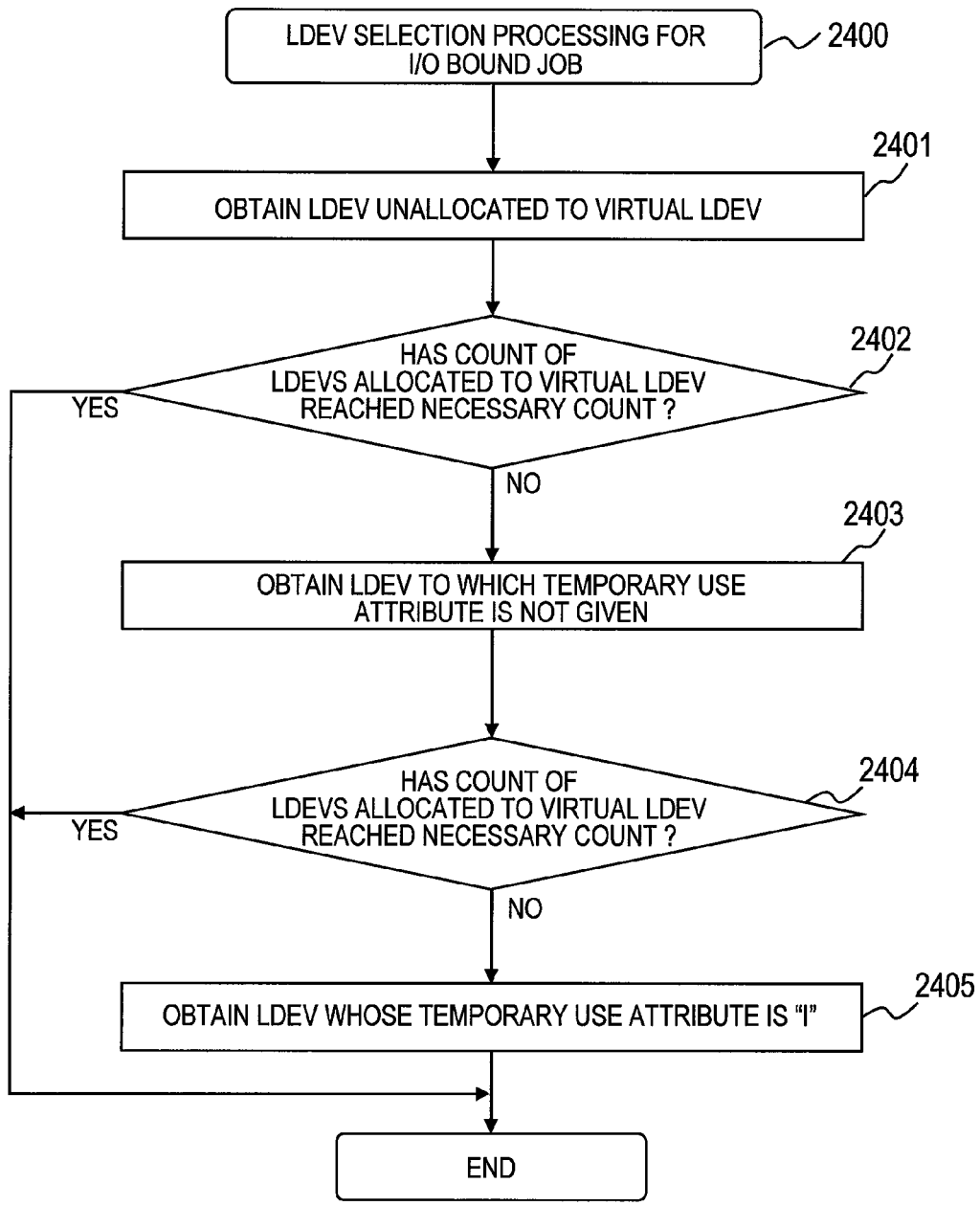
FIG. 16 is a flow chart showing a procedure of LDEV selection processing for an I/O bound job according to the first embodiment of this invention.
Figure 17:
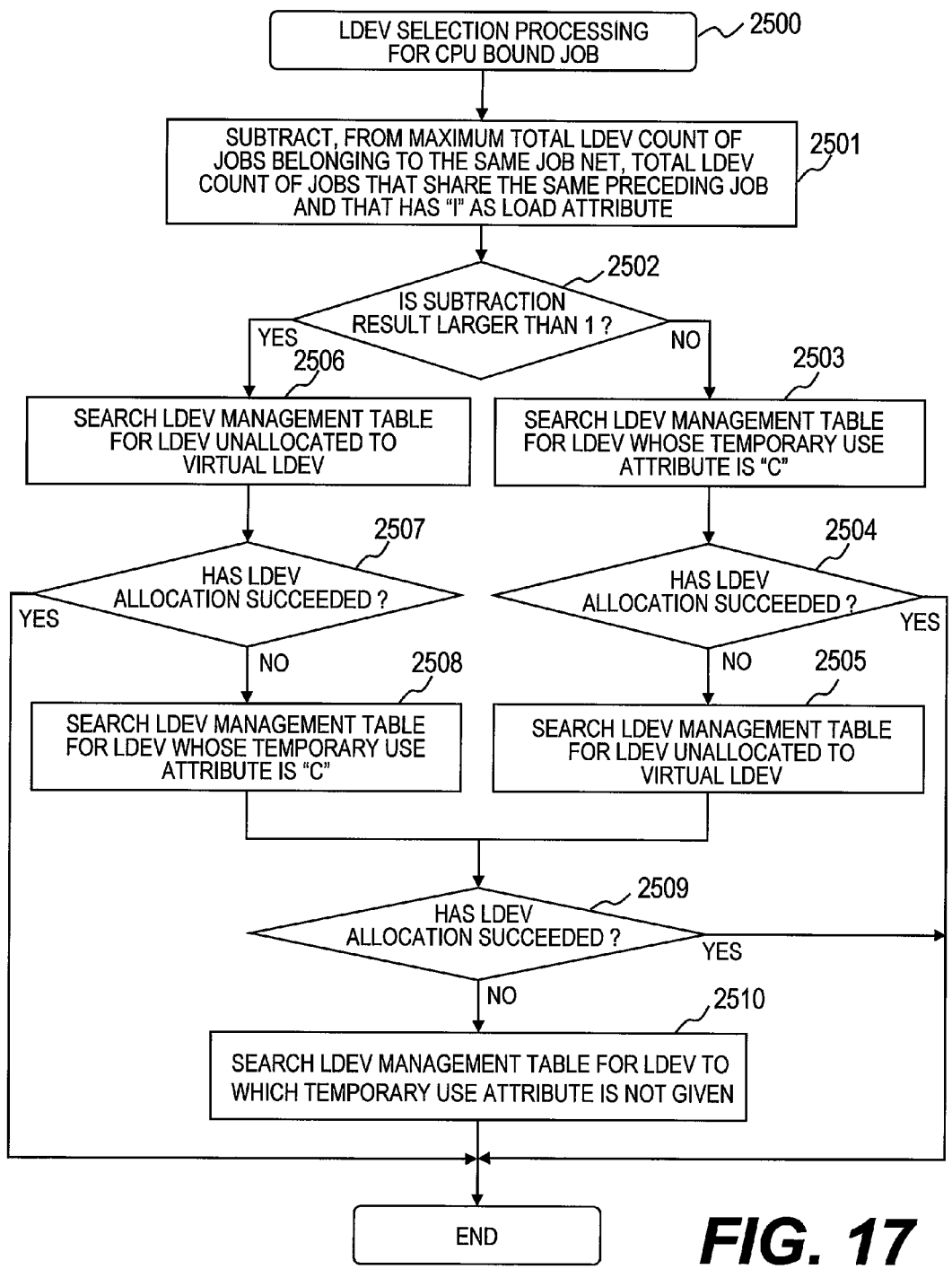
FIG. 17 is a flow chart showing a procedure of LDEV selection processing for a CPU bound job according to the first embodiment of this invention.

Described below is a procedure of selecting LDEVs to be allocated to a file in the virtual LU allocation processing 2200 according to the first embodiment of this invention. FIG. 16 illustrates LDEV selection processing executed when the load attribute of a job to be executed is that of an I/O bound job. FIG. 17 illustrates LDEV selection processing executed when the load attribute of a job to be executed is that of a CPU bound job.

In the following description, an LDEV is called a "spin-on LDEV" when it belongs to the RAID group 32 whose RAID group identifier 241 matches the RAID group identifier 222 and whose entry in the spin state management table 240 has the spin state flag 242 set to "ON". An LDEV is called a "spin-off LDEV" when it belongs to the RAID group 32 whose RAID group identifier 241 matches the RAID group identifier 222 and whose entry in the spin state management table 240 has the spin state flag 242 set to "OFF".

An LDEV is called a "C-LDEV" when the allocation state 223 is "virtual LDEV" and the value of the temporary use attribute 224 is "C". An LDEV is called an "I-LDEV" when the allocation state 223 is "virtual LDEV" and the value of the temporary use attribute 224 is "I". An LDEV is called a "non-temporary LDEV" when the allocation state 223 is "virtual LDEV" and the value of the temporary use attribute 224 is neither "C" nor "I". An LDEV is called an "unallocated LDEV" when the value of the allocation state 223 is "unallocated".

FIG. 16 is a flow chart showing a procedure of LDEV selection processing 2400 for an I/O bound job according to the first embodiment of this invention.

The controller section 20 of the storage system 2 searches the LDEV management table 220 for the LDEVs 33 that are unallocated LDEVs. Of the found LDEVs 33, spin-on unallocated LDEV are allocated first to the virtual LDEV 35 and then spin-off unallocated LDEVs are allocated until the LDEV count 258 is reached (Step 2401). At this point, "I" is set to the temporary use attribute 224 in entries of the LDEV management table 220 for the LDEVs 33 allocated to the virtual LDEV 35.

The controller section 20 of the storage system 2 judges whether or not the count of the LDEVs 33 allocated to the virtual LDEV 35 in Step 2401 has reached the LDEV count 258 (Step 2402).

When the count of the LDEVs 33 allocated to the virtual LDEV 35 has not reached the LDEV count 258 (the answer to Step 2402 is "No"), the controller section 20 of the storage system 2 searches the LDEV management table 220 for the LDEVs 33 that are non-temporary LDEVs. In a case where multiple non-temporary LDEVs are found, spin-on non-temporary LDEVs among the found LDEVs 33 are allocated first to the virtual LDEV 35 and then spin-off non-temporary LDEVs are allocated until the LDEV count 258 is reached. However, any of the found LDEVs 33 that is being used by another job in the job net that contains the job to be executed is excluded from among the LDEVs to be allocated in order to avoid input/output competition with a permanent file (Step 2403).

The controller section 20 of the storage system 2 judges whether or not the count of the LDEVs 33 allocated to the virtual LDEV 35 has reached the LDEV count 258 as a result of Step 2403 (Step 2404).

When the count of the LDEVs 33 allocated to the virtual LDEV 35 has not reached the LDEV count 258 (the answer to Step 2404 is "No"), the controller section 20 of the storage system 2 searches the LDEV management table 220 for the LDEVs 33 that are I-LDEVs, and allocates the found LDEVs 33 to the virtual LDEV 35 until the LDEV count 258 is reached. In a case where multiple LDEVs 33 meets the condition in Step 2405, the LDEVs 33 that are allocated to fewer virtual LDEVs 35 are allocated first to the virtual LDEV 35 in question so that each LDEV 33 is allocated to an equal count of virtual LDEVs 35.

In the LDEV selection processing 2400 for an I/O bound job, when too many disk drives are in a spin-on state increasing the power consumption of the storage system 2, an upper limit may be set to the spin-on disk drive count to limit the count of LDEVs 33 allocated to the virtual LDEV 35 in order to prevent the power consumption from growing larger than a given amount. In this case, the total number of the spin state management table 240 that have the spin state flag 242 set to "ON" is counted before Step 2401. An upper limit is set in advance to the spin-on disk drive count and kept in the shared memory 23 in Steps 2401 and 2403. When the upper limit of the spin-on disk drive count is larger than the count of spin-on LDEVs, spin-on LDEVs alone are allocated to the virtual LDEV 35 while excluding spin-off LDEVs.

FIG. 17 is a flow chart showing a procedure of LDEV selection processing 2500 for a CPU bound job according to the first embodiment of this invention.

The controller section 20 of the storage system 2 searches the job information management table 250 for entries that have the same job net identifier 251, selects jobs that are likely to be executed simultaneously from these entries, and obtains a maximum value for the sum of the LDEV counts 258 of these jobs. The obtained maximum value indicates the maximum count of LDEVs that are used simultaneously in the job net. Jobs that are likely to be executed simultaneously are, for example, jobs that share the same preceding job identifier 253. The controller section 20 of the storage system 2 picks up entries whose load attribute 254 is "I" (in other words, entries about I/O bound jobs) from among the entries that share the same preceding job identifier 253 with the job on which the LDEV selection processing 2500 is being performed, sums up the LDEV counts 258 of the picked up entries, and subtracts the sum from the obtained maximum value (Step 2501).

The controller section 20 of the storage system 2 judges whether or not the value obtained in Step 2501 is larger than 1 (Step 2502).

When the value obtained in Step 2501 is 1 or smaller (the answer to Step 2502 is "No"), it means that the count of LDEVs 33 that are in use during the execution of the job on which the LDEV selection processing 2500 is being performed is the highest possible count in the job net that is being executed. Accordingly, if even one unallocated LDEV 33 is newly allocated to the virtual LDEV 35, power consumption could be increased from too many disk drives 31 in a spin-on state. Therefore, when the value obtained in Step 2501 is 1 or smaller, reduction in power consumption is given priority and an LDEV that is being used in another CPU bound job (C-LDEV) is chosen as a place to which the temporary file is output.

Specifically, the controller section 20 of the storage system 2 searches the LDEV management table 220 for a C-LDEV and allocates the C-LDEV to the virtual LDEV 35 (Step 2503). In a case where multiple C-LDEVs are found, spin-on C-LDEVs are allocated before spin-off C-LDEVs.

The controller section 20 of the storage system 2 next judges whether or not any LDEV 33 has been allocated to the virtual LDEV 35 in Step 2503 (Step 2504). In a case where at least one LDEV 33 has been allocated to the virtual LDEV 35 in Step 2503 (the answer to Step 2504 is "Yes"), this processing is ended.

In a case where no LDEV 33 has been allocated to the virtual LDEV 35 in Step 2503 (the answer to Step 2504 is "No"), the controller section 20 of the storage system 2 searches the LDEV management table 220 for an unallocated LDEV and allocates this LDEV to the virtual LDEV 35 (Step 2505). When multiple unallocated LDEVs are found, spin-on unallocated LDEVs are allocated before spin-off unallocated LDEVs. The temporary use attribute 224 is set to "C" in an entry of the LDEV management table 220 that holds the identifier of the LDEV 33 allocated to the virtual LDEV 35 in Step 2505.

When the value obtained in Step 2501 is larger than 1, on the other hand (the answer to Step 2502 is "Yes"), more LDEVs are used at other times than during the execution of the job on which the LDEV selection processing 2500 is being performed. Accordingly, allocating an unallocated LDEV to the CPU bound job on which the LDEV selection processing 2500 is being performed does not raise the total count of LDEVs used in the job net. Therefore, when the value obtained in Step 2501 is larger than 1, processing performance is given priority and an unallocated LDEV is chosen to be allocated to the virtual LDEV 35 by the controller section 20 of the storage system 2.

Specifically, the controller section 20 of the storage system 2 searches the LDEV management table 220 for an unallocated LDEV and allocates this LDEV to the virtual LDEV 35 (Step 2506). In a case where multiple unallocated LDEVs are found, spin-on unallocated LDEVs are allocated before spin-off unallocated LDEVs. The temporary use attribute 224 is set to "C" in an entry of the LDEV management table 220 that holds the identifier of the LDEV 33 allocated to the virtual LDEV 35 in Step 2506.

The controller section 20 of the storage system 2 judges whether or not any LDEV 33 has been allocated to the virtual LDEV 35 in Step 2506 (Step 2507). In a case where at least one LDEV 33 has been allocated to the virtual LDEV 35 in Step 2506 (the answer to Step 2507 is "Yes"), this processing is ended.

In a case where no LDEV 33 has been allocated to the virtual LDEV 35 in Step 2506 (the answer to Step 2507 is "No"), the controller section 20 of the storage system 2 searches the LDEV management table 220 for a C-LDEV and allocates this LDEV to the virtual LDEV 35 (Step 2508). When multiple C-LDEVs are found, spin-on C-LDEVs are allocated before spin-off C-LDEVs.

The controller section 20 of the storage system 2 further judges whether or not any LDEV 33 has been allocated to the virtual LDEV 35 in Step 2505 or Step 2508 (Step 2509). In a case where at least one LDEV 33 has been allocated to the virtual LDEV 35 in Step 2505 or Step 2508 (the answer to Step 2509 is "Yes"), this processing is ended.

In a case where no LDEV 33 has been allocated to the virtual LDEV 35 in Step 2505 or Step 2508 (the answer to Step 2509 is "No"), the controller section 20 of the storage system 2 searches the LDEV management table 220 for a non-temporary LDEV and allocates this LDEV to the virtual LDEV 35 (Step 2510). When multiple non-temporary LDEVs are found, spin-on non-temporary LDEVs are allocated before spin-off non-temporary LDEVs. However, any of the found LDEVs 33 that is being used by another job in the job net that contains the job to be executed is excluded from among the LDEVs to be allocated in order to avoid input/output competition with a permanent file.

Figure 18:
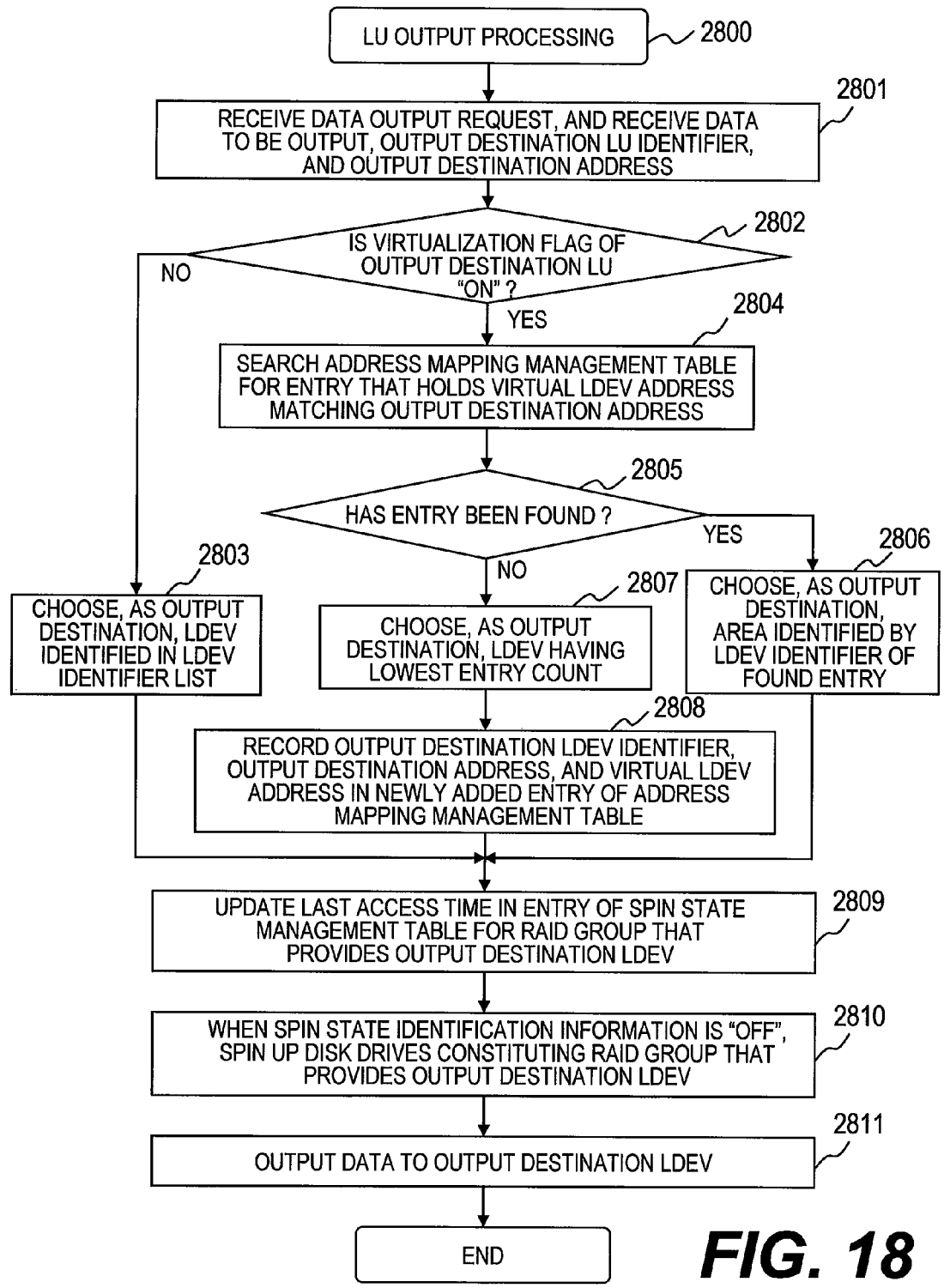
FIG. 18 is a flow chart showing a procedure of LU output processing according to the first embodiment of this invention.

FIG. 18 is a flow chart showing a procedure of LU output processing 2800 according to the first embodiment of this invention. This processing is executed by running the control programs stored in the controller section 20.

The CHA 21 in the controller section 20 of the storage system 2 receives a data output request made by the computer 1, and also receives data to be output, an output destination LU identifier, and an output destination address (Step 2801).

The controller section 20 of the storage system 2 checks the virtualization flag 202 of an entry that holds the received output destination LU identifier to judge whether the output destination LU is a virtual LU or a real LU (Step 2802).

When the virtualization flag 202 is set to "OFF", which means that the output destination LU is a real LU (the answer to Step 2802 is "Yes"), the controller section 20 of the storage system 2 chooses the LDEV 33 that is on the LDEV identifier list 203 as the output destination (Step 2803).

When the virtualization flag 202 is set to "ON", which means that the output destination LU is a virtual LU (the answer to Step 2802 is "No"), the controller section 20 of the storage system 2 searches the address mapping management table 230 for an entry whose virtual LDEV address 231 matches the received output destination address (Step 2804). The controller section 20 of the storage system 2 judges whether or not any entry is found in Step 2804 (Step 2805).

When at least one entry is found in Step 2804 (the answer to Step 2805 is "Yes"), the controller section 20 of the storage system 2 chooses an area identified by the LDEV identifier 232 of this entry as the output destination (Step 2806).

When no entry is found in Step 2804 (the answer to Step 2805 is "No"), the controller section 20 of the storage system 2 searches the address mapping management table 230 for entries that have the same LDEV identifier 232, chooses an LDEV address that has the fewest entries among the found entries, allocates an area to this LDEV address to make the area count of each LDEV even throughout the same virtual LDEV, and outputs data to the allocated area (Step 2807). The controller section 20 of the storage system 2 creates a new entry in the address mapping management table 230, and records the output destination LDEV identifier, the output destination address, and the virtual LDEV address in the new entry as the LDEV address 232, the LDEV address 233, and the virtual LDEV address 231 (Step 2808).

The controller section 20 of the storage system 2 obtains from the LDEV management table 220 the RAID group identifier 222 of the LDEV to which the data has been output, and updates the last access time 243 of an entry of the spin state management table 240 whose RAID group identifier 241 matches the obtained RAID group identifier 222 with a time at which the data has been output (Step 2809). In a case where the spin state flag 242 is "OFF", spin up is performed on every disk drive 31 in the RAID group 32 that is identified by the RAID group identifier 241 (Step 2710).

Lastly, the controller section 20 of the storage system 2 outputs the data requested by the computer 1 to the output destination LDEV (Step 2711).

Figure 19:
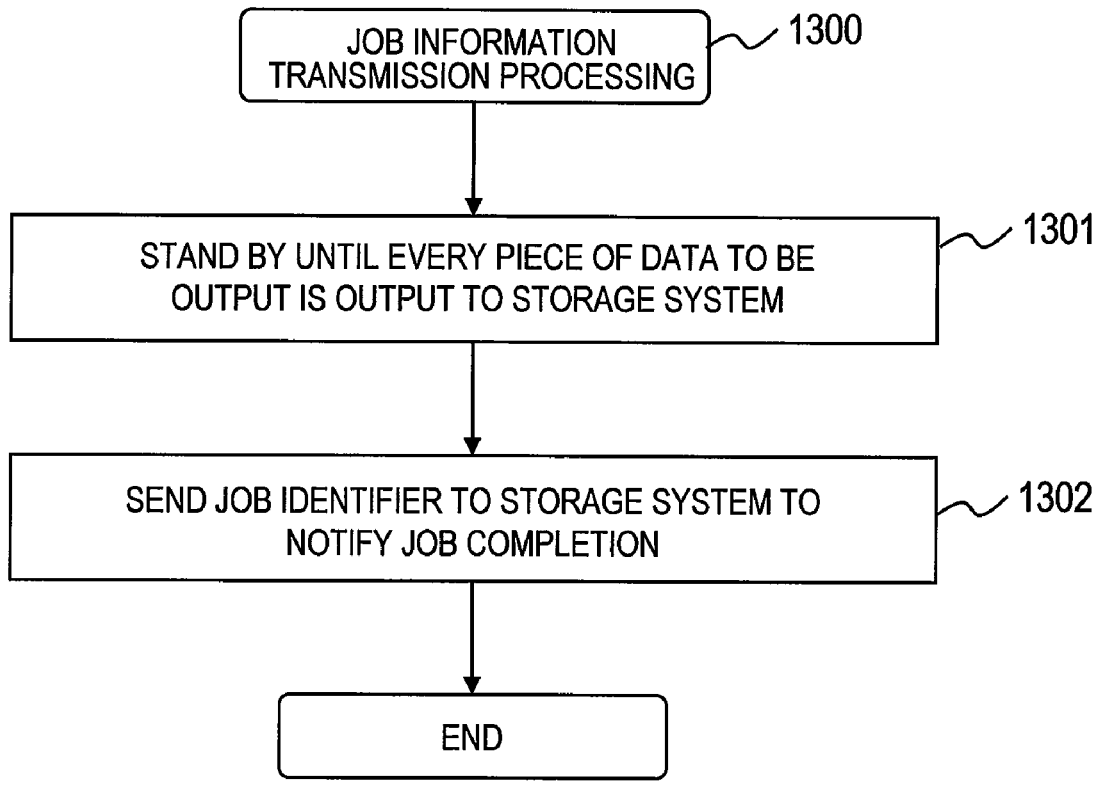
FIG. 19 is a flow chart showing a procedure of job ending processing according to the first embodiment of this invention.

FIG. 19 is a flow chart showing a procedure of job ending processing 1300 according to the first embodiment of this invention. This processing is executed by the CPU 11 of the computer 1 by running the job management program 1000.

The CPU 11 of the computer 1 issues an fsync system call or the like to wait until every piece of data remaining in an input/output buffer which is stored in the main memory 10 is output to the storage system 2 (Step 1301).

The CPU 11 of the computer 1 sends the job identifier of the job that is being executed to the storage system 2 and notifies the storage system 2 of the completion of the job (Step 1302).

Figure 20:
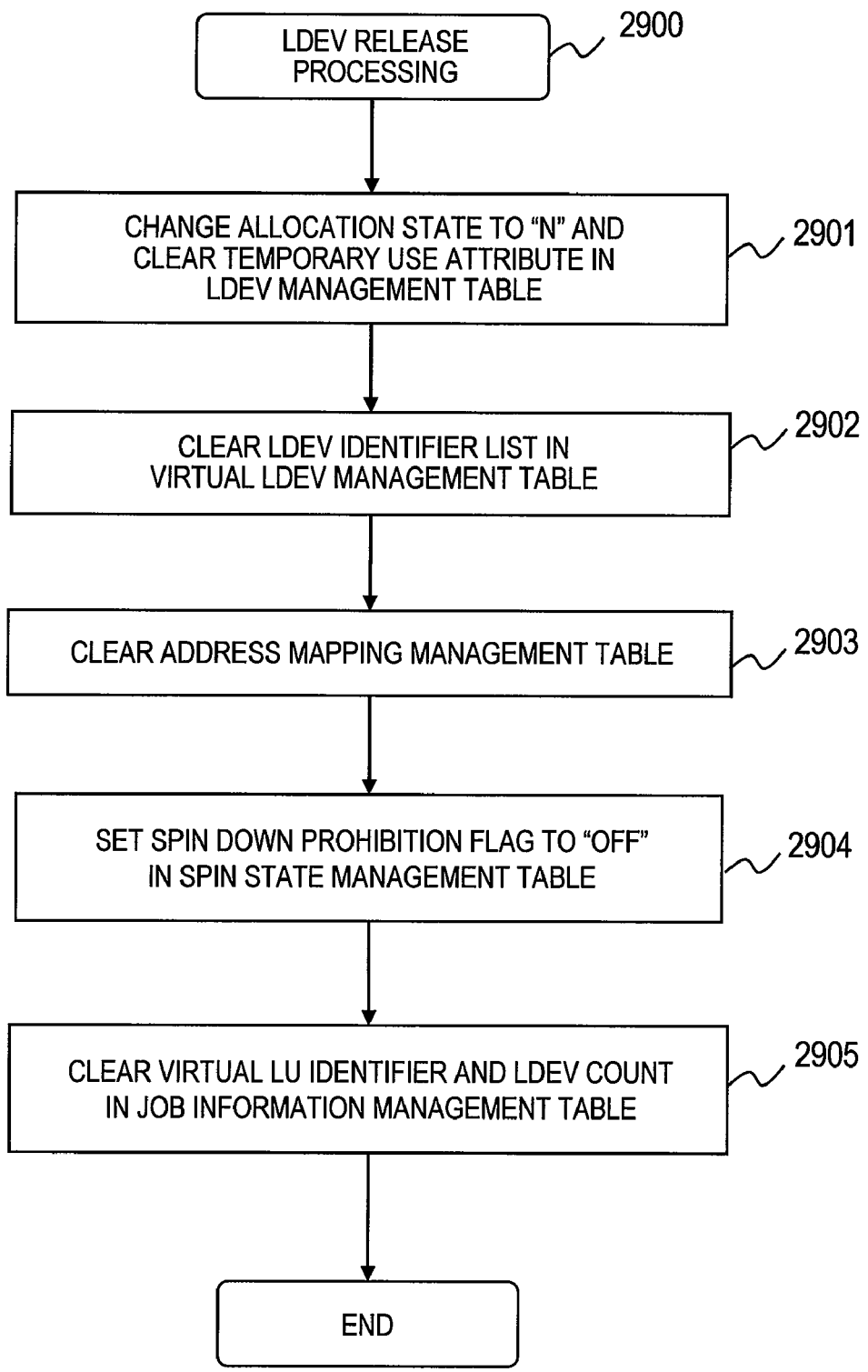
FIG. 20 is a flow chart showing a procedure of LDEV release processing according to the first embodiment of this invention.

FIG. 20 is a flow chart showing a procedure of LDEV release processing 2900 according to the first embodiment of this invention.

This processing is executed by running the control program stored in the controller section 20. Through this processing, the LDEV 33 allocated to the virtual LDEV 35 that stores a temporary file is released after the execution of a job is completed.

The controller section 20 of the storage system 2 receives a job completion notification from the computer 1 through the CHA 21 (Step 2901).

The controller section 20 of the storage system 2 receives a request to release the LDEV 33 and releases the LDEV 33 allocated to the virtual LDEV 35, making the LDEV 35 ready for use in other processing. Specifics of the LDEV release processing 2900 will be described below.

The controller section 20 of the storage system 2 searches the virtual LDEV management table 210 for an entry for the virtual LDEV 35 on which the LDEV release processing 2900 is being performed, and obtains the LDEV identifier list 212 of this entry. For every LDEV 33 on the obtained LDEV identifier list 212, the allocation state 223 is changed to "N" and the temporary use attribute 224 is cleared in the LDEV management table 220 (Step 2902). The LDEV 33 allocated to the virtual LDEV 35 on which the LDEV release processing 2900 is being performed is turned unallocated through the processing of Step 2902.

The controller section 20 of the storage system 2 clears the LDEV identifier list 212 in the entry of the virtual LDEV management table 210 for the virtual LDEV 35 on which the LDEV release processing 2900 is being performed (Step 2903). The controller section 20 of the storage system 2 then clears the address mapping management table 230 of the virtual LDEV 35 on which the LDEV release processing 2900 is being performed (Step 2904). The relation between the virtual LDEV 35 on which the LDEV release processing 2900 is being performed and the LDEV 33 that has been allocated to this virtual LDEV 35 is cleared through the processing of Steps 2903 and 2904.

The controller section 20 of the storage system 2 sets the spin down prohibition flag 244 to "OFF" in an entry of the spin state management table 240 whose RAID group identifier 241 matches the RAID group identifier 222 associated with the newly unallocated LDEV 33 (Step 2905). The controller section 20 of the storage system 2 also clears the virtual LU identifier 257 and the LDEV count 258 in the job information management table 250 (Step 2906). The virtual LU identifier 257 and the LDEV count 258 are set anew at the time the next job is executed.

Figure 21:
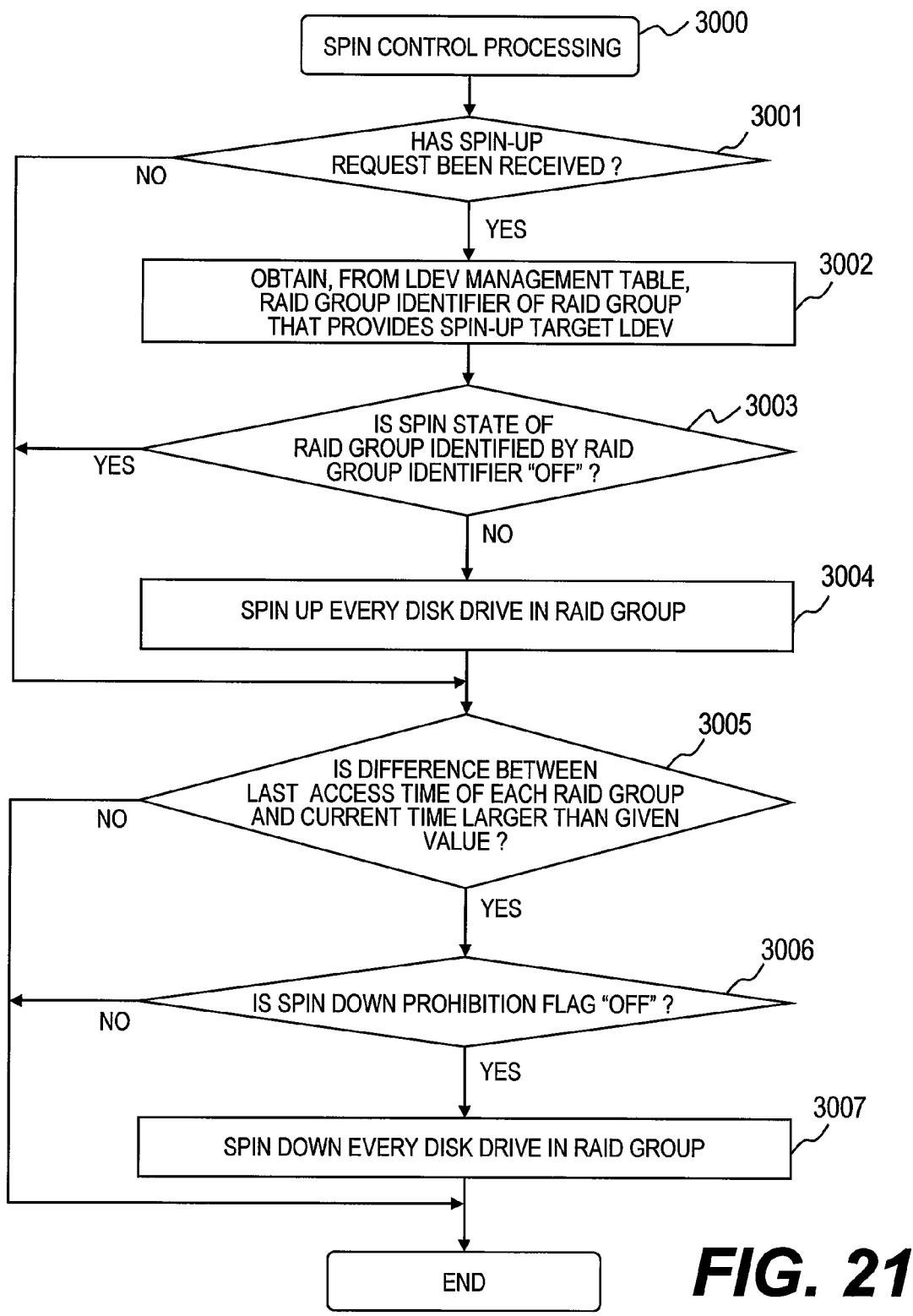
FIG. 21 is a flow chart showing a procedure of spin control processing of the disk drives 31 according to the first embodiment of this invention.

FIG. 21 is a flow chart showing a procedure of spin control processing 3000 of the disk drives 31 according to the first embodiment of this invention. This processing is executed by running the control program stored in the controller section 20.

The controller section 20 of the storage system 2 judges whether or not the CHA 21 has received a data output request from the computer 1 (Step 3001). In a case where the CHA 21 has not received the data output request from the computer 1 (the answer to Step 3001 is "No"), Step 3005 is executed.

In a case where the CHA 21 has received the data output request from the computer 1 (the answer to Step 3001 is "Yes"), the controller section 20 of the storage system 2 identifies which RAID group 32 contains the LDEVs 33 that constitute an LU requested to spin up (Step 3002).

Specifically, the controller section 20 of the storage system 2 looks up the LU management table 200 for an entry that holds the LU identifier 124 sent along with a spin-up request, and obtains the LDEV identifier list 203 of this entry. An LDEV identifier on the obtained LDEV identifier list 203 is then used to obtain the RAID group identifier 222 from the LDEV management table 220.

In a case where the virtualization flag 202 is "ON", a virtual LDEV identifier is obtained from the LDEV identifier list 203 to obtain the LDEV identifier list 212 of the virtual LDEV 35 that is identified by the obtained virtual LDEV identifier from the virtual LDEV management table 210. The obtained LDEV identifier list 212 is used to obtain the RAID group identifier 222 from the LDEV management table 220.

The controller section 20 of the storage system 2 extracts from the spin state management table 240 an entry whose RAID group identifier 241 matches the obtained RAID group identifier 222, and judges whether or not the spin state flag 242 of this entry is "OFF" (Step 3003). When the spin state flag 242 is "OFF" (the answer to Step 3003 is "Yes"), spin up is performed on every disk drive 31 in the RAID group 32 that is identified by the obtained RAID group identifier 222 (Step 3004).

In a case where the disk drive 31 that is in a spin-on state has not been accessed for a given period of time, the controller section 20 of the storage system 2 spins down this disk drive 31 to save power consumption.

Specifically, the controller section 20 of the storage system 2 checks each entry of the spin state management table 240 to judge whether or not the spin state management table 240 has an entry in which the difference between the last access time 243 and the current time exceeds a given length of time (Step 3005). The controller section 20 of the storage system 2 also judges whether or not the spin down prohibition flag 244 of the RAID group 32 that has not been accessed for a given period of time is "OFF" (Step 3006).

In a case where the spin state management table 240 has an entry in which the difference between the last access time 243 and the current time exceeds a given length of time (the answer to Step 3005 is "Yes") and the spin down prohibition flag 244 of the RAID group 32 that has not been accessed for a given period of time is "OFF" (the answer to Step 3006 is "Yes"), the controller section 20 of the storage system 2 performs spin down on every disk drive 31 that constitutes this RAID group 32 (Step 3007).

According to the first embodiment of this invention, in executing a CPU bound job, which LDEV 33 is to be allocated to a logical volume is selected based on how many LDEVs 33 are being used simultaneously in jobs that are executed at the same time as the CPU bound job. Specifically, when the count of LDEVs 33 that are being used simultaneously is low, unallocated LDEVs are selected to improve the processing performance. When the count of LDEVs 33 that are being used simultaneously is high, the LDEVs 33 that are being used in another CPU bound job are selected to save power of the storage system 2.

The first embodiment of this invention also makes it possible to maintain the processing efficiency of a job executed in the computer 1 while reducing the power consumption of the storage system 2. Accordingly, the overall power consumption of the computer system 9 can be reduced without increasing the power consumption of the computer 1 that accompanies prolonging of processing time.

Second Embodiment

In the first embodiment of this invention, the computer 1 requests the storage system 2 to allocate an LDEV to an LU where a temporary file is to be stored, and the storage system 2 selects a virtual LU. In the second embodiment of this invention, a power saving-first attribute and a performance-first attribute are set to each logical volume in advance in the computer 1, and are recorded in the logical volume list 130. The CPU 11 of the computer 1 then runs the job management program 1000 to select a logical volume based on the logical volume list 130.

Also, the storage system 2 allocates the LDEV 33 to the virtual LDEV 35 at the time the LU 34 is accessed for the first time during the execution of a job instead of at a time requested by the computer 1 before the job is started.

The second embodiment of this invention shares some features with the first embodiment of this invention, and a description on the common features may be omitted here.

The hardware configuration of the computer system 9 in the second embodiment is the same as in the first embodiment. In the second embodiment, the computer 1 selects a logical volume by referring to the logical volume list 130. The storage system 2 does not need the job information management table 250 since logical volume selection is conducted by the computer 1.

Various types of information stored in the computer 1 and the storage system 2 in the second embodiment will be described by comparison with the first embodiment.

Information stored in the computer 1 will be described first. The job net definition information 100, job definition information 110, and job file definition information 120 contained in the computer 1 in the second embodiment are the same as in the first embodiment.

Of processing executed by the job management program 1000 while run by the CPU 11 of the computer 1, processing unique to the second embodiment of this invention will be described later.

The logical volume list 130 is a list that holds information on logical volumes provided by the storage system 2. Details of the logical volume list 130 will be given later with reference to FIG. 22A.

Described next is information stored in the storage system 2.

The LU management table 200, the LDEV management table 220, the address mapping management table 230, and the spin state management table 240 have the same configurations as those in the first embodiment of this invention. The job information management table 250 is unnecessary in the second embodiment of this invention as mentioned above.

The virtual LDEV management table 210 of the second embodiment of this invention contains in each entry a temporary use attribute 213 in addition to the items of the virtual LDEV management table 210 of the first embodiment of this invention which are shown in FIG. 5. In short, the virtual LDEV management table 210 of the second embodiment of this invention contains in each entry the virtual LDEV identifier 211, the LDEV identifier list 212, and the temporary use attribute 213.

The virtual LDEV identifier 211 and the LDEV identifier list 212 in the second embodiment of this invention are the same as in the first embodiment of this invention.

The temporary use attribute 213 is the same as the temporary use attribute 224 of the LDEV management table 220.

The temporary use attribute 213 may be added to the LU management table 200 instead of the virtual LDEV management table 210.

FIG. 22A is a diagram showing the configuration of the logical volume list 130 according to the second embodiment of this invention.

The logical volume list 130 holds an entry for each logical volume. Each entry of the logical volume list 130 contains a logical volume identifier 131, an LU identifier 132, and a volume attribute 133.

The logical volume identifier 131 indicates a number or character string used to identify the logical volume in question uniquely throughout the computer 1, and is expressed as, for example, a volume serial number (VSN), a volume label, or a device number (DEVN).

The LU identifier 132 indicates the LU identifier of the LU 34 that is associated with the logical volume. The volume attribute 133 is information indicating whether the logical volume gives priority to power saving or performance.

FIG. 22B is a diagram showing an example of a logical volume list file 139 according to the second embodiment of this invention.

The logical volume list file 139 is a file defining a list of logical volumes that can be allocated by the job management program 1000 to a temporary file. The logical volume list file 139 is stored in a logical volume provided by the storage system 2. The logical volume list file 139 is actually stored in the LDEV 33 to which the logical volume is mapped.

Written in the logical volume list file 139 are a volume attribute 133 and a logical volume identifier 131 of a logical volume that can be allocated to a temporary file that has this volume attribute 133.

The computer 1 first reads the logical volume list file 139 stored in a logical volume provided by the storage system 2. The computer 1 analyzes the read logical volume list file 139, and stores the contents of the logical volume list file 139 in the logical volume list 130. For instance, as a result of reading and analyzing the first line of the logical volume list file 139 of FIG. 22B, an entry that holds "VOL01" as the logical volume identifier 131 and an entry that holds "VOL02" as the logical volume identifier 131 are created in the logical volume list 130.

The storage system 2 sets the performance-first attribute or the power saving-first attribute to each virtual LDEV 35 or virtual LU in advance instead of executing the job information reception processing 2100. The storage system 2 then stores "I" as the temporary use attribute 213 of the virtual LDEV management table 210 when the virtual LDEV 35 or the virtual LU is to give priority to performance, and "C" when power saving is to be given priority.

The CPU 11 of the computer 1 runs the job management program 1000 to thereby execute job information reading processing 1400 and temporary file allocation processing 1500 instead of the job information transmission processing 1100 and the pre-job execution processing 1200.

Figure 23:
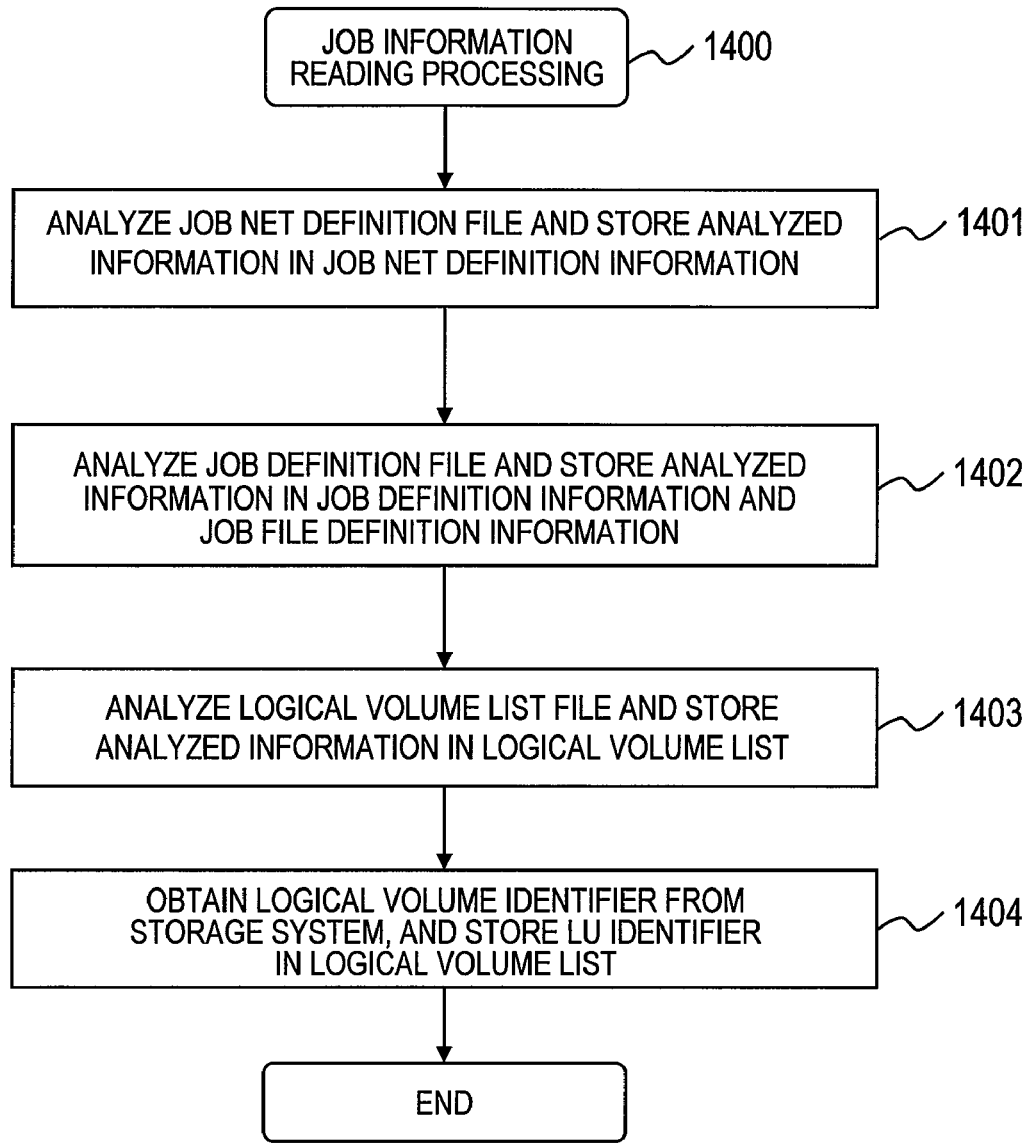
FIG. 23 is a flow chart showing a procedure of a job information reading processing according to the second embodiment of this invention.

FIG. 23 is a flow chart showing a procedure of the job information reading processing 1400 according to the second embodiment of this invention. This processing is executed by the CPU 11 of the computer 1 by running the job management program 1000.

Step 1401 and Step 1402 are the same as Step 1101 and Step 1102 of the job information transmission processing 1100 shown in FIG. 10.

The CPU 11 of the computer 1 reads out of the storage system 2 or other places the job net definition file 109 of a job net that is instructed by a user to be executed. The CPU 11 of the computer 1 analyzes the read job net definition file 109, and stores the result of the analysis in the job net definition information 100 (Step 1401).

The CPU 11 of the computer 1 reads out of the storage system 2 or other places the job definition file 119 of a job that is identified by the job identifier 102 in one entry of the job net definition information 100, and repeats this for the rest of the entries in the job net definition information 100. The CPU 11 of the computer 1 analyzes the read job definition file 119, and stores the analyzed information in the job definition information 110 and the job file definition information 120 (Step 1402).

The CPU 11 of the computer 1 reads the logical volume list file 139, allocates a memory area in the main memory 10, and analyzes the logical volume list file 139. The volume attribute 133 and logical volume identifier 131 written in the logical volume list file 139 are extracted and stored in the logical volume list 130 (Step 1403).

The CPU 11 of the computer 1 obtains from the storage system 2 an LU identifier that is associated with the logical volume identifier 131, and stores the obtained LU identifier as the LU identifier 132 (Step 1404).

Figure 24:
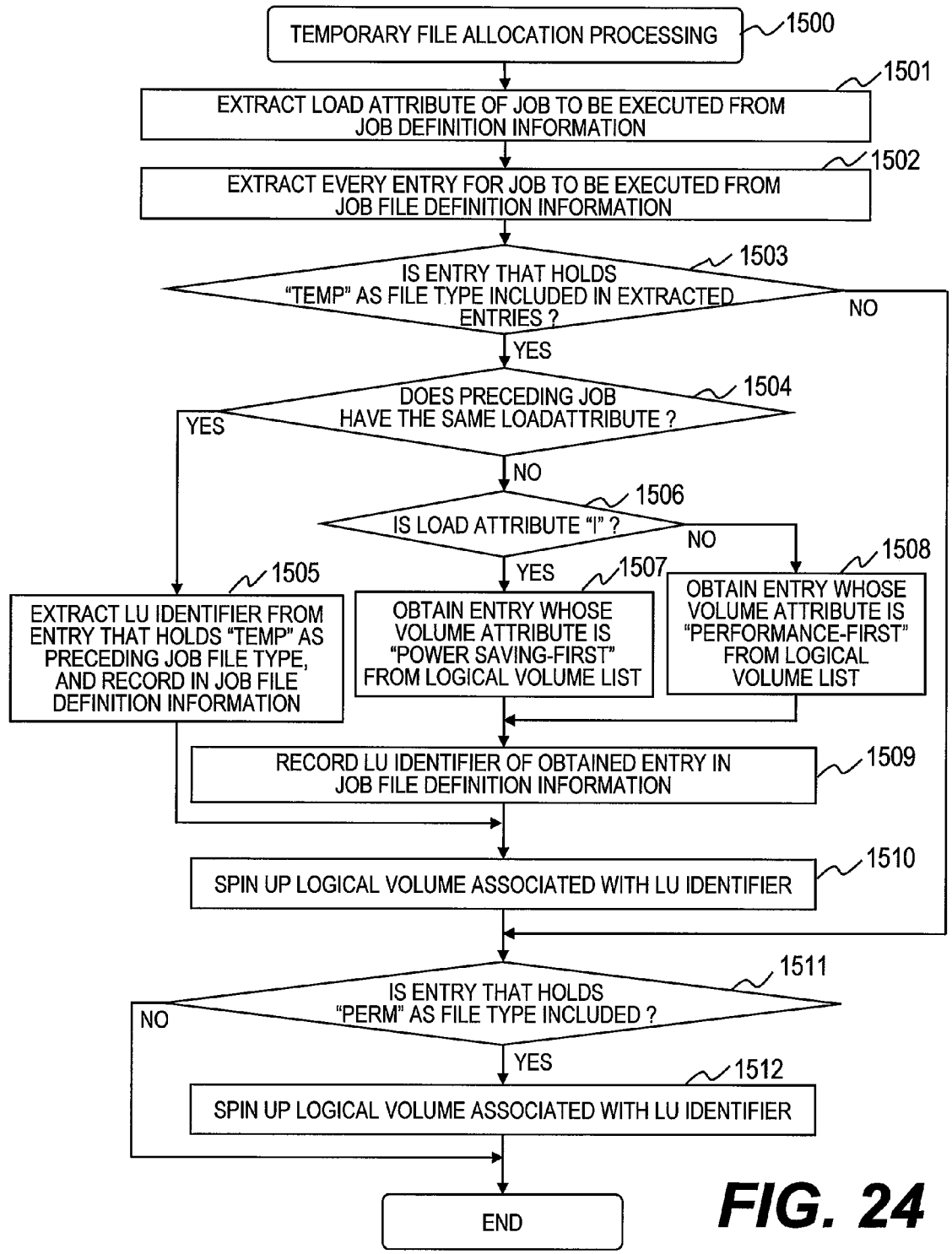
FIG. 24 is a flow chart showing a procedure of the temporary file allocation processing according to the second embodiment of this invention.

FIG. 24 is a flow chart showing a procedure of the temporary file allocation processing 1500 according to the second embodiment of this invention. This processing is executed by the CPU 11 of the computer 1 by running the job management program 1000.

The CPU 11 of the computer 1 first chooses a job ready to be executed from the job net definition information 100. The CPU 11 of the computer 1 also extracts the load attribute 112 of the chosen job from the job definition information 110 (Step 1501).

The CPU 11 of the computer 1 extracts from the job file definition information 120 every entry whose job identifier 121 matches the job identifier of the job to be executed (Step 1502).

The CPU 11 of the computer 1 judges whether or not the extracted entries of the job file definition information 120 include an entry whose file type 122 is "TEMP" (Step 1503).

When the extracted entries of the job file definition information 120 include an entry whose file type 122 is "TEMP" (the answer to Step 1503 is "Yes"), the CPU 11 of the computer 1 judges whether or not any of the extracted entries is for a job that is executed prior to the job to be executed and that has a load attribute matching the load attribute of the job to be executed (Step 1504).

When the job to be executed and a preceding job have the same value as the load attribute 112 (the answer to Step 1504 is "Yes"), the CPU 11 of the computer 1 obtains from the job file definition information 120 an entry for the preceding job whose file type 122 is "TEMP". The LU identifier 124 of the obtained entry is recorded in an entry of the job file definition information 120 for the job to be executed that holds "TEMP" as the file type 122 (Step 1505). By thus allocating a temporary file of the job to be executed to a logical volume to which a temporary file of a preceding job has been allocated, this logical volume can be kept in a spin-up state.

When no preceding job has the same load attribute 112 as the job to be executed (the answer to Step 1504 is "No"), or when there are multiple preceding jobs, the CPU 11 of the computer 1 judges whether or not the job to be executed has "I" (I/O bound job) as the value of the load attribute 112 (Step 1506).

When the load attribute 112 of the job to be executed holds the value "I" (the answer to Step 1506 is "Yes"), the CPU 11 of the computer 1 extracts from the logical volume list 130 an entry whose volume attribute 133 is "performance first" (Step 1507). On the other hand, when the load attribute 112 of the job to be executed holds the value "C" (CPU bound job) (the answer to Step 1506 is "No"), the CPU 11 of the computer 1 extracts from the logical volume list 130 an entry whose volume attribute 133 is "power saving first" (Step 1508).

After finishing Step 1507 or Step 1508, the CPU 11 of the computer 1 records the LU identifier that is associated with the allocated logical volume as the LU identifier 124 in the job file definition information 120 (Step 1509).

The CPU 11 of the computer 1 spins up the allocated logical volume (Step 1510). Specifically, the CPU 11 of the computer 1 issues a spin-up request to the storage system 2 or directly accesses the logical volume.

The CPU 11 of the computer 1 judges whether or not the extracted entries include an entry whose file type 122 is "PERM" (Step 1511). When the extracted entries include an entry whose file type 122 is "PERM" (the answer to Step 1511 is "Yes"), the CPU 11 of the computer 1 request the storage system 2 to spin up a logical volume that is identified by the LU identifier 124 of this entry (Step 1512). In Step 1512, spin up of the logical volume identified by the LU identifier 124 of the extracted entry may be executed by accessing this logical volume.

Figure 25:
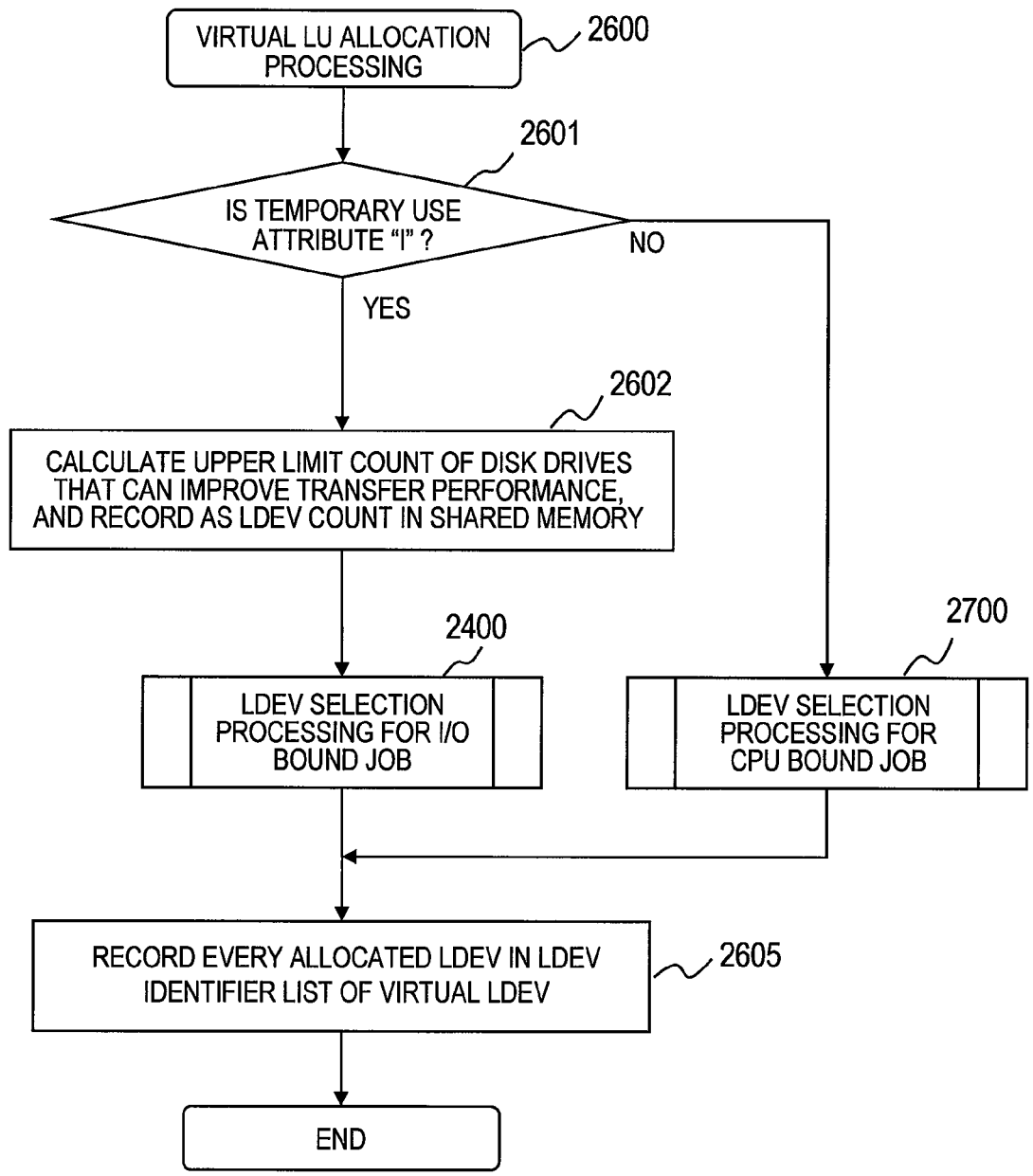
FIG. 25 is a flow chart showing a procedure of virtual LU allocation processing according to the second embodiment of this invention.

FIG. 25 is a flow chart showing a procedure of virtual LU allocation processing 2600 according to the second embodiment of this invention.

This processing is executed by running the control program stored in the controller section 20 of the storage system 2. A job executed in the computer 1 sends a logical volume access request, and it is after the controller section 20 of the storage system 2 receives the logical volume access request via the CHA 21 of the storage system 2 that this processing is executed.

The controller section 20 of the storage system 2 judges whether or not the requested virtual LDEV 35 or virtual LU has "I" as the value of the temporary use attribute 213 (Step 2601).

When the requested virtual LDEV 35 or virtual LU has "I" as the value of the temporary use attribute 213 (the answer to Step 2601 is "Yes"), the controller section 20 of the storage system 2 calculates how many LDEVs 33 are necessary, and records the calculated count as the LDEV count 258 in the shared memory 23 (Step 2602). Specifically, the controller section 20 of the storage system 2 calculates the upper limit count of the disk drives 31 that can be allocated to improve the transfer performance, based on the maximum amount of data transferred per unit time between the requested virtual LU and the computer 1 and the maximum data transfer amount per unit time of the disk drives 31. Thereafter, the controller section 20 of the storage system 2 executes the I/O bound job LDEV selection processing 2400 of the first embodiment of this invention which is shown in FIG. 16, to thereby select at least one LDEV 33 to which the temporary file is to be allocated (Step 2603).

When the requested virtual LDEV 35 or virtual LU does not have "I" as the value of the temporary use attribute 213, in other words, when the temporary use attribute 213 is "C" (the answer to Step 2601 is "No"), the controller section 20 of the storage system 2 executes LDEV selection processing 2700 for a CPU bound job which will be described later, to thereby select at least one LDEV 33 to which the temporary file is to be allocated (Step 2604).

Lastly the controller section 20 of the storage system 2 records the LDEV identifier(s) of the selected LDEV(s) 33 in the LDEV identifier list 203 (Step 2605).

Figure 26:
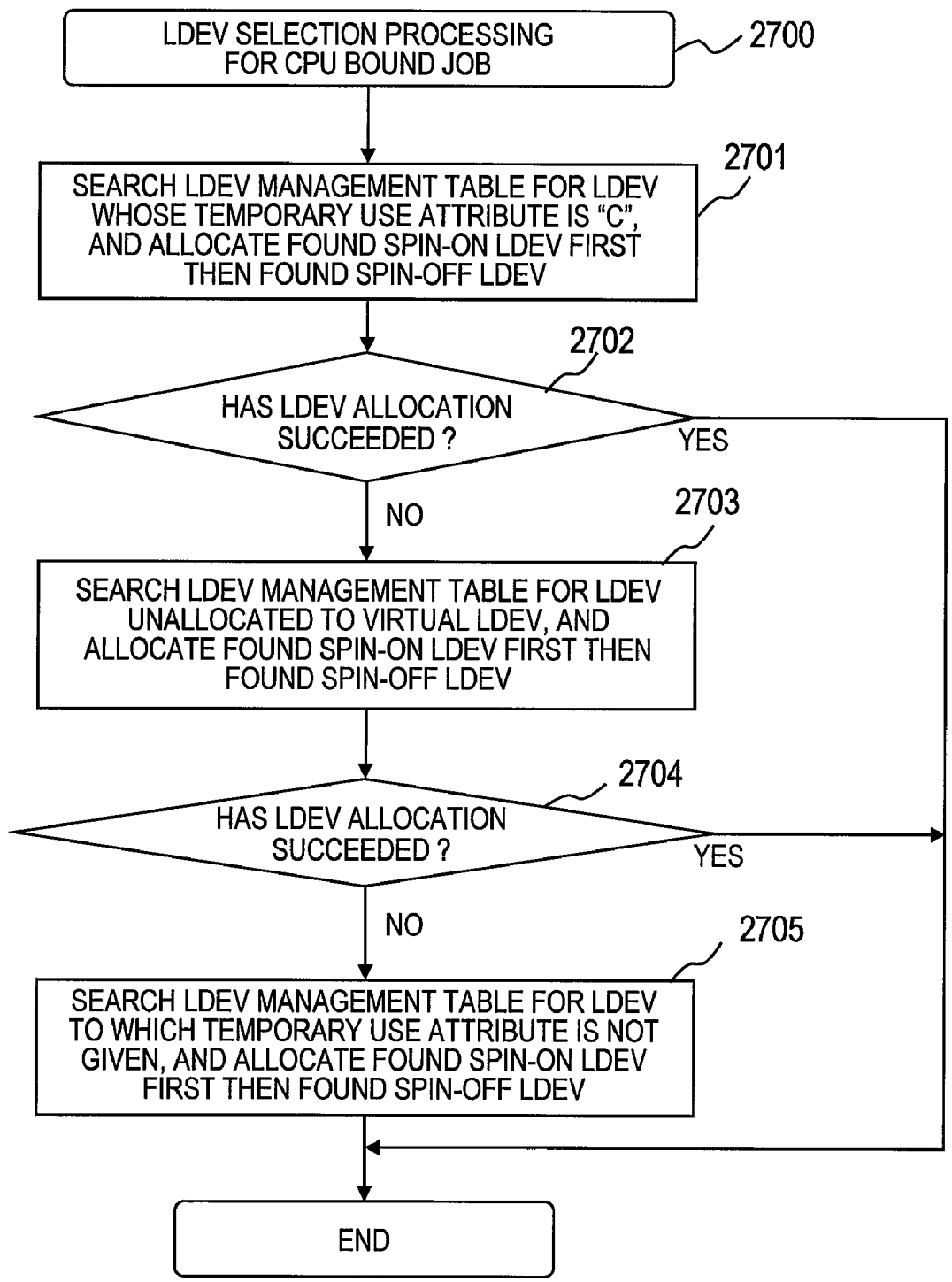
FIG. 26 is a flow chart showing a procedure of the LDEV selection processing for a CPU bound job according to the second embodiment of this invention.

FIG. 26 is a flow chart showing a procedure of the LDEV selection processing 2700 for a CPU bound job according to the second embodiment of this invention.

The controller section 20 of the storage system 2 searches the LDEV management table 220 for a C-LDEV and allocates this LDEV to the virtual LDEV 35 (Step 2701). In a case where multiple C-LDEVs are found, spin-on C-LDEVs are allocated before spin-off C-LDEVs.

The controller section 20 of the storage system 2 next judges whether or not any LDEV 33 has been allocated to the virtual LDEV 35 in Step 2701 (Step 2702). In a case where at least one LDEV 33 has been allocated to the virtual LDEV 35 in Step 2701 (the answer to Step 2702 is "Yes"), this processing is ended.

In a case where no LDEV 33 has been allocated to the virtual LDEV 35 in Step 2701 (the answer to Step 2702 is "No"), the controller section 20 of the storage system 2 searches the LDEV management table 220 for an unallocated LDEV and allocates this LDEV to the virtual LDEV 35 (Step 2703). When multiple unallocated LDEVs are found, spin-on unallocated LDEVs are allocated before spin-off unallocated LDEVs. The temporary use attribute 224 is set to "C" in an entry of the LDEV management table 220 that holds the identifier of the LDEV 33 allocated to the virtual LDEV 35 in Step 2703.

The controller section 20 of the storage system 2 judges whether or not any LDEV 33 has been allocated to the virtual LDEV 35 in Step 2703 (Step 2704). In a case where at least one LDEV 33 has been allocated in Step 2703 (the answer to Step 2704 is "Yes"), this processing is ended.

In a case where no LDEV 33 has been allocated to the virtual LDEV 35 in Step 2703 (the answer to Step 2704 is "No"), the controller section 20 of the storage system 2 searches the LDEV management table 220 for a non-temporary LDEV and allocates this LDEV to the virtual LDEV 35 (Step 2705). When multiple non-temporary LDEVs are found, spin-on non-temporary LDEVs are allocated before spin-off non-temporary LDEVs. However, any of the found LDEVs 33 that is being used by another job in the job net that contains the job to be executed is excluded from among the LDEVs to be allocated in order to avoid input/output competition with a permanent file.

The LU output processing 2800 according to the second embodiment of this invention is obtained by adding processing of judging whether or not there is any LDEV 33 allocated to the virtual LU to which the output request has been issued between Step 2802 and Step 2804 of the LU output processing 2800 according to the first embodiment of this invention. In other words, whether or not any value is set to the LDEV identifier list 212 of the virtual LDEV management table 210 is judged. When there is no LDEV 33 allocated to the virtual LU to which the output request has been issued, the virtual LU allocation processing 2600 shown in FIG. 25 is executed. Except the above processing, the LU output processing 2800 of the second embodiment is the same as the LU output processing 2800 of the first embodiment, which is shown in FIG. 18.

The job ending processing 1300 according to the second embodiment of this invention replaces Step 1302 with a step of requesting the storage system 2 to release the allocated LDEV 33 from the LU associated with the logical volume. The rest of the job ending processing 1300 of the second embodiment is the same as the job ending processing 1300 of the first embodiment, which is shown in FIG. 19.

The LDEV release processing 2900 according to the second embodiment of this invention is the same as the LDEV release processing 2900 of the first embodiment which is shown in FIG. 20 except that Step 2905 is not executed since the job information management table 250 is not used in the second embodiment.

The spin control processing 3000 according to the second embodiment of this invention is the same as the spin control processing 3000 of the first embodiment, which is shown in FIG. 21.

According to the second embodiment of this invention, as in the first embodiment of this invention, selection of a disk drive where a temporary file that is accessed by a job executed in the computer 1 is stored can be made in a manner that maintains the processing efficiency while reducing power consumption, and power saving in the storage system 2 is thus accomplished.

The second embodiment of this invention also makes the storage system 2 power-efficient by, while a CPU bound job is executed, selecting an LDEV 33 that is being used by another CPU bound job.

While the present invention has been described in detail and pictorially in the accompanying drawings, the present invention is not limited to such detail but covers various obvious modifications and equivalent arrangements, which fall within the purview of the appended claims.

What is claimed is:

1. A storage system coupled to a computer that executes a data processing job by running a program, comprising:
an interface coupled to the computer;
a storage controller coupled to the interface; and
disk drives in which data read or written by the computer is stored,
wherein the storage controller is configured to:
provide logical volumes to the computer by allocating at least one storage area of the disk drives to the logical volumes;
control spinning of disks in the disk drives;
receive job information which contains an execution order of the job and a load attribute of the job from the computer before the job is executed, wherein the load attribute includes either a first load attribute which indicates that load of computation processing by the computer has high priority in the job execution, or a second load attribute which indicates load of reading or writing data to the logical volumes has high priority in the job execution;
select a logical volume to which none of the storage areas are allocated when requested by the computer to provide a logical volume for storing a file that is used temporarily by the job to be executed;
select which storage area to allocate to the selected logical volume based on at least one of the job execution order and the load attribute;
allocate the selected storage area to the selected logical volume; and
notify the computer of the selected logical volume.

2. The storage system according to claim 1, wherein, the storage controller is further configured to select at least one storage area allocated to a logical volume that stores a file used temporarily by another job that has the first load attribute when the job to be executed has the first load attribute.

3. The storage system according to claim 2, wherein the job is included in a group of jobs with which a series of business operations is executed, and
wherein the storage controller is further configured to:
calculate a maximum total count of storage areas that can be allocated to each logical volume accessed by a job that is included in the group of jobs and that is likely to be executed at the same time as the job to be executed when the job to be executed has the first load attribute;
calculate a total count of storage areas that are allocated to a logical volume accessed by a job that is likely to be executed at the same time as the job to be executed and that has the second load attribute; and
select a storage area that has not been allocated to any logical volume before a storage area that is allocated to a logical volume where a file used temporarily by the job with the first load attribute is stored when the difference between the calculated maximum total count and the calculated total storage area count is larger than one.

4. The storage system according to claim 1, wherein, the storage controller is further configured to select a storage area that has not been allocated to any logical volume when the job to be executed has the second load attribute.

5. The storage system according to claim 1, wherein, the storage controller is further configured to start the spinning of a disk in a disk drive that provides the selected storage area when allocating the selected storage area to the selected logical volume.

6. The storage system according to claim 1, wherein, the storage controller controls a disk drive that provides the selected storage area in a manner that prevents the disk drive from stop spinning of the disk when allocating the selected storage area to the selected logical volume.

7. The storage system according to claim 1, wherein the storage controller is further configured to select a storage area provided by a disk drive that is in a spin-on state prior to a storage area provided by a disk drive that is in a spin-off state.

8. The storage system according to claim 1, wherein the storage controller is further configured to:
identify a job that is placed next to the job executed in the job execution order; and
start the spinning of a disk in a disk drive that provides a storage area allocated to a logical volume that is accessed during the execution of the identified job.

9. The storage system according to claim 1, wherein the storage controller is further configured to:
identify a job that is placed next to the job to be executed in the job execution order; and
control a disk drive that provides a storage area allocated to a logical volume that is accessed during the execution of the identified job in a manner that prevents the disk drive from stop spinning of the disk.

10. A computer running a program to execute a data processing job and coupled to a storage system, the storage system having disk drives each of which includes a disk whose spinning can be controlled, the storage system providing logical volumes to the computer by allocating the storage areas to the logical volumes, comprising:
an interface coupled to the storage system;
a processor coupled to the interface; and
a memory coupled to the processor,
wherein the memory stores:
logical volume information containing a use attribute which is defined to each of the logical volumes to indicate to which one of processing performance and power consumption the logical volume gives priority; and
job information containing an execution order of the job and a load attribute of the job, wherein the load attribute includes either a first load attribute which indicates that load of computation processing by the computer has high priority in the job execution, or a second load attribute which indicates load of reading or writing data to the logical volumes has high priority in the job execution, and wherein the processor is configured to:
select, before executing the job, a logical volume for storing a file that is used temporarily in the execution of the job based on the load attribute of the job and the use attribute of the logical volume;
send to the storage system a request to allocate a storage area to the selected logical volume along with the use attribute of the selected logical volume; and
notify the storage system of completion of the job when the execution of the job is finished.

11. The computer according to claim 10, wherein the processor is further configured to:
identify a job that is placed next to the job executed in the execution order contained in the job information;
designate logical volume that is accessed by the identified job;
notify the storage system of the designated logical volume; and
request the storage system to start the spinning of a disk in a disk drive that provides storage area allocated to the notified logical volume.

12. The computer according to claim 10,
wherein the computer has a job queue in which jobs waiting to be executed are stored, and
wherein the processor is further configured to:
store jobs in the job queue in accordance with the job execution order;
designate logical volume that is accessed by a waiting job before the waiting job is taken out of the job queue; and
request the storage system to start the spinning of a disk in a disk drive that provides storage areas allocated to logical volume that is accessed by the waiting job.

13. A computer system comprising:
a computer that executes a data processing job by running a program; and
a storage system where data read or written by the computer is stored,
wherein the computer has a first interface coupled to the storage system, a processor coupled to the first interface, and a memory coupled to the processor,
wherein the storage system has a second interface coupled to the computer, a storage controller coupled to the second interface, and disk drives in which data read or written by the computer is stored,
wherein the storage controller provides logical volumes to the computer by allocating the storage areas to the logical volumes,
wherein the storage controller controls spinning of disks in the disk drives, wherein the memory stores:
logical volume information containing a use attribute which is defined to each of the logical volumes to indicate to which one of processing performance and power consumption the logical volume gives priority; and
job information containing an execution order of the job and a load attribute of the job, wherein the load attribute includes either a first load attribute which indicates that load of computation processing by the computer has high priority in the job execution, or a second load attribute which indicates load of reading or writing data to the logical volumes has high priority in the job execution,
wherein, before executing the job, the processor selects a logical volume for storing a file that is used temporarily during the execution of the job based on the load attribute of the job and the use attribute of the logical volume,
wherein the processor sends to the storage system a request to allocate a storage area to the selected logical volume along with the use attribute of the selected logical volume,
wherein, upon reception of the request to allocate a storage area to the selected logical volume, the storage controller selects which storage area to allocate to the selected logical volume based on the use attribute of the selected logical volume,
wherein the storage controller allocates the selected storage area to the selected logical volume,
wherein the processor notifies the storage system of completion of the job when the execution of the job is finished, and
wherein, when notified of the completion of the job, the storage controller releases the storage area that has been allocated to the selected logical volume.

14. The computer system according to claim 13, wherein, when the job to be executed has the first load attribute, the storage controller selects a storage area allocated to a logical volume that stores a file used temporarily by another job that has the first load attribute.

15. The computer system according to claim 14,
wherein the job is included in a group of jobs with which a series of business operations is executed,
wherein, when the job to be executed has the first load attribute, the storage controller calculates a maximum total count of storage areas that can be allocated to each logical volume accessed by a job that is included in the group of jobs and that is likely to be executed at the same time as the job to be executed,
wherein the storage controller calculates a total count of storage areas that are allocated to a logical volume accessed by a job that is likely to be executed at the same time as the job to be executed and that has the second load attribute, and
wherein, when the difference between the calculated maximum total count and the calculated total storage area count is larger than one, the storage controller selects a storage area that has not been allocated to any logical volume before a storage area that is allocated to a logical volume where a file used temporarily by the job with the first load attribute is stored.

16. The computer system according to claim 13, wherein, when the job to be executed has the second load attribute, the storage controller selects a storage area that has not been allocated to any logical volume.

17. The computer system according to claim 13,
wherein the processor identifies a job that is placed next to the job executed in the execution order contained in the job information,
wherein the processor designates logical volume that is accessed by the identified job,
wherein the processor notifies the storage system of the designated logical volume, and
wherein the storage controller request to start the spinning of a disk in a disk drive that provides storage area allocated to the notified logical volume.

* * * * *